United States Patent
Veya et al.

(10) Patent No.: US 12,115,808 B2
(45) Date of Patent: Oct. 15, 2024

(54) UV-VIS RADIATION RADICALLY CURABLE SECURITY INKS

(71) Applicant: SICPA HOLDING SA, Prilly (CH)

(72) Inventors: Patrick Veya, Aclens (CH); Angèle Monney, Fribourg (CH)

(73) Assignee: SICPA HOLDING SA, Prilly (CH)

( * ) Notice: Subject to any disclaimer, the term of this patent is extended or adjusted under 35 U.S.C. 154(b) by 691 days.

(21) Appl. No.: 17/431,395

(22) PCT Filed: Jan. 30, 2020

(86) PCT No.: PCT/EP2020/052264
§ 371 (c)(1),
(2) Date: Aug. 16, 2021

(87) PCT Pub. No.: WO2020/169316
PCT Pub. Date: Aug. 27, 2020

(65) Prior Publication Data
US 2022/0305835 A1   Sep. 29, 2022

(30) Foreign Application Priority Data
Feb. 21, 2019 (EP) ..................... 19158515

(51) Int. Cl.
| B42D 25/378 | (2014.01) |
| B42D 25/373 | (2014.01) |
| B42D 25/405 | (2014.01) |
| C09D 11/037 | (2014.01) |
| C09D 11/101 | (2014.01) |
| C09D 11/107 | (2014.01) |

(52) U.S. Cl.
CPC ......... B42D 25/378 (2014.10); B42D 25/373 (2014.10); B42D 25/405 (2014.10); C09D 11/037 (2013.01); C09D 11/101 (2013.01); C09D 11/107 (2013.01)

(58) Field of Classification Search
CPC .. B42D 25/378; B42D 25/373; B42D 25/405; B42D 25/29; B42D 25/387; B42D 25/40; B42D 25/23; C09D 11/037; C09D 11/101; C09D 11/107; C09D 11/03; C09C 1/0015; C09C 1/48; C09C 3/045
See application file for complete search history.

(56) References Cited

U.S. PATENT DOCUMENTS

| 4,705,300 A | 11/1987 | Berning et al. |
| 4,705,356 A | 11/1987 | Berning et al. |
| 4,721,271 A | 1/1988 | Goldstein et al. |
| 5,084,351 A | 1/1992 | Philips et al. |
| 5,214,530 A | 5/1993 | Coombs et al. |
| 5,281,480 A | 1/1994 | Philips et al. |
| 5,383,995 A | 1/1995 | Philips et al. |
| 5,569,535 A | 10/1996 | Philips et al. |
| 5,571,624 A | 11/1996 | Philips et al. |
| 8,147,932 B2 | 4/2012 | Despland et al. |
| 2002/0096087 A1 | 7/2002 | Glausch |
| 2004/0069187 A1 | 4/2004 | Umehara et al. |
| 2013/0196125 A1 | 8/2013 | Toyoda et al. |
| 2015/0166799 A1* | 6/2015 | Schoenefeld ......... C09C 1/0024 427/213 |
| 2015/0174945 A1 | 6/2015 | Garnier et al. |
| 2016/0207344 A1 | 7/2016 | Klein et al. |
| 2018/0066150 A1* | 3/2018 | Nishimoto .......... C09D 11/101 |
| 2019/0211184 A1* | 7/2019 | Nesvadba ............ C07D 309/32 |

FOREIGN PATENT DOCUMENTS

| EP | 1090963 A1 | 4/2001 |
| EP | 1260563 A1 | 11/2002 |
| EP | 2504400 B1 | 10/2012 |
| JP | 2013119598 | 6/2013 |
| JP | 2013158933 | 8/2013 |
| RU | 2621657 | 6/2017 |
| WO | 03/020834 A1 | 3/2003 |
| WO | 2006/117271 A1 | 11/2006 |
| WO | 2013/119387 A1 | 8/2013 |
| WO | 2018041935 | 3/2018 |

OTHER PUBLICATIONS

Handbook of Print Media, Helmut Kipphan, Springer Edition, 2001, p. 48.
Printing Technology, J. M. Adams and P. A. Dolin, Delmar Thomson Learning, 5th Edition, 2002, pp. 359-360.
The Printing Ink Manual, R.H. Leach and R.J. Pierce, Springer Edition, 5th Edition, 2008, pp. 58-62.
Printing Technology, J. M. Adams and P. A. Dolin, Delmar Thomson Learning, 5th Edition, 2002, pp. 293-328.
Handbook of Print Media, H. Kipphan, Springer, 2001, pp. 409-422 and pp. 498-499.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

(Continued)

*Primary Examiner* — Jennifer A Smith
*Assistant Examiner* — Jeffrey Eugene Barzach
(74) *Attorney, Agent, or Firm* — Muncy, Geissler, Olds & Lowe, P.C.

(57) ABSTRACT

The present invention relates to the field of security inks suitable for printing security features on substrates, in particular on security documents or articles as well as security features made from said security inks, and security documents comprising a security feature made from said security inks. In particular, the invention provides UV-Vis radiation radically curable security inks comprising an ink vehicle and pigments comprising a flake-shaped non-metallic or metallic substrate comprising one or more at least partial coating layers, an at least partial surface treatment layer made of one or more surface modifiers selected from fluoro compounds.

19 Claims, No Drawings

(56) References Cited

OTHER PUBLICATIONS

International Search Report and Written Opinion issued with respect to application No. PCT/EP2020/052264.
Gurevich E.S. Organicheskiye zashchitnyye pokrytiya. MASHGIZ 1959. 352 pp.
Lamburn R. Lakokrasochnyye materialy ipokrytiya. Teoriya i praktika. 1991, 512 pp.
Bulgakov N.V. et al. Tovarovedeniye promyshlennyh tovarov: vvedeniye, plasticheskiye massy, khimiko-moskatelnyye tovary. GOSTORGIZDAT. 1962, 368 pp.
Russian Patent Office Action in counterpart Russia Patent Application No. RU 2021127015 dated Sep. 11, 2023 (and English language translation of Office Action).
Japan Patent Office Action in counterpart Japanese Application No. JP 2021-548593 A dated Aug. 29, 2023 (and English language translation of Office Action).

\* cited by examiner

UV-VIS RADIATION RADICALLY CURABLE SECURITY INKS

The present invention relates to the field of security inks suitable for printing security features on substrates, in particular on security documents or articles.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means features in these documents.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

Examples of overt security features include reflective features and optically variable features, wherein said security features exhibit a color shift or color change, expressed by a change of the lightness and/or chroma and/or hue, upon variation of the angle of observation. Typically, said security features are made from inks comprising flake-shaped multilayer interference pigments.

WO 2003/020834 A1 discloses water-based security inks comprising flake-shaped multilayer interference pigments for producing optically variable security features. With the aim of avoiding or reducing corrosion of the pigments in the water-based inks, the surface of said pigments is treated by a passivating agent such as for example fluorinated organic esters of phosphoric acid. However, water-based security inks may be difficult to print and result in a long drying process.

WO 2006/117271 A1 discloses solvent-based security inks comprising flake-shaped multilayer interference pigments for producing optically variable security features. However, the increasing sensitivity of the public to environmental concerns, as well as the necessary responsiveness of the chemical industry to environmental regulations such as REACH and GHS, have resulted in the formulation of inks containing a significantly reduced amount of organic solvent (volatile organic components, VOC) and have motivated the industry to develop UV-Vis curable screen printing inks comprising said flake-shaped pigments.

It is known in the art that the perceived optical characteristics of reflective features and optically variable features comprising flake-shaped pigments depend on said flake-shaped pigments orientation in the dried ink on a substrate. Whereas the gradual drying process of water-based or solvent-based inks comprising flake-shaped pigments advantageously allows a reduction of the thickness of said applied inks and allows the flake-shaped pigments to orient themselves substantially parallel to the substrate onto which said inks are applied and thus produce reflective features and optically variable exhibiting good optical characteristics, the instantaneous hardening process of UV-Vis curable inks comprising flake-shaped pigment may lead to a random orientation of said pigments and thus produce reflective features and optically variable that may exhibit poor optical characteristics.

With the aim of improving the striking effect and the optical properties of reflective features and optically variable security features based on flake-shaped pigments, said pigments have been surface treated with hydrophobic compounds so that they arrange more readily in a plane substantially parallel to the substrate onto which inks comprising said pigments are applied. Surface treated pigments are referred in the literature as leafing pigments.

EP 1 090 963 A1 discloses flaky iridescent pigments being surface treated with fluorine-containing phosphates as well as inks, paints, plastics or cosmetics comprising said pigments. EP 1 090 963 A1 discloses a solvent-based gravure printing ink.

US 2002/0096087 discloses platelet-shaped pearl luster pigments on the basis of a platelet-shaped pigment containing at least one organic hydrophobic coupling agent such as for example fluorine-containing silanes and their use in paints, inks, plastics, coatings and cosmetics.

US 2004/0069187 discloses flaky pigments coated with a coupling agent and an organic compound having a perfluoroalkyl group and their use in printing inks.

US 2015/0166799 disclosed flake-form effect pigments coated with an organic coating which contains fluoroalkyl groups and hydrophilic groups built up from at least one siloxane and/or at least one silane and their use in many applications and their use in paints, inks, plastics, coatings and cosmetics.

US 2016/0207344 discloses a printed image which consists of at least two area units on a substrate, where a first area unit comprises first flake-form effect pigments comprising an outer layer comprising a non-metallic, inorganic material, and a second area unit comprises a second flake-form effect pigments, comprising an outer layer comprising an organic surface modifier such as organofunctional siloxanes contain fluoroalkyl groups and aminoalkyl groups. US 2016/0207344 discloses printing inks which may be solvent-based inks or UV-Vis curable inks.

WO 2013/119387 A1 discloses UV-Vis curable metallic decorative composition comprising leafing metallic pigment flakes, an acrylate oligomer and/or an acrylate monomer, an initiator or mixture of initiators, and a cure accelerator that is a tertiary amine. The disclosed leafing metallic pigment flakes are surface treated with fatty acids, phosphorous compounds, silane or aliphatic amines. The disclosed UV-Vis curable ink suffers from poor optical properties including a poor visual appearance and from a low chroma.

Therefore, a need remains for solvent-free or low VOC containing UV-Vis curable security inks, in particular for highly demanding applications requiring high counterfeiting resilience and excellent optical properties, for producing reflective features and optically variable features based on flake-shaped multilayer interference pigments, wherein said security features exhibit improved optical characteristics in terms of chroma, lightness and/or colorshifting properties.

SUMMARY

Accordingly, it is an object of the present invention to overcome the deficiencies of the prior art as discussed above.

In a first aspect, the present invention provides UV-Vis radiation radically curable security inks, preferably UV-Vis radiation radically curable screen printing security inks, comprising:

i) from about 75 to about 99 wt-% of an ink vehicle having a viscosity between about 200 and about 2000 mPas at 25° C. and comprising
  a) from about 25 to about 55 wt-% of one or more radically curable oligomers having a molecular weight higher than 800 g/mol eq PS,
  b) from about 10 to about 50 wt-% of one or more radically curable monomers selected from the group consisting of
    i. triacrylates selected from the group consisting of trimethylolpropane triacrylates, trimethylolpropane trimethacrylates, alkoxylated trimethylolpropane triacrylates, alkoxylated trimethylolpropane trimethacrylates, alkoxylated glycerol triacrylates, pentaerythritol triacrylates, alkoxylated pentaerythritol triacrylates and mixtures thereof, preferably selected from the group consisting of trimethylolpropane triacrylates, alkoxylated trimethylolpropane triacrylates, alkoxylated glycerol triacrylates, pentaerythritol triacrylates and mixtures thereof
    ii. tetraacrylates selected from the group consisting of ditrimethylolpropane tetraacrylates, pentaerythritol tetraacrylates, alkoxylated pentaerythritol tetraacrylates and mixtures thereof, preferably selected from the group consisting of ditrimethylolpropane tetraacrylates, alkoxylated pentaerythritol tetraacrylates and mixtures thereof
    iii. and mixtures thereof
  c) from about 0.1 to about 20 wt-% of one or more free radical photoinitiators, preferably selected from the group consisting of aminoketones, hydroxyketones, alkoxyketones, acetophenones, benzophenones, ketosulfones, benzyl ketals; benzoin ethers, phosphine oxides, phenylglyoxylates, thioxanthones, and mixtures thereof, more preferably selected from the group consisting of phosphine oxides, alpha-hydroxyketones, and mixtures thereof
  d) optionally up to about 50 wt-% of one or more reactive diluents being radically curable monomers selected from monoacrylates, diacrylates and mixtures thereof; the weight percent of a), b), c) and d) being based on the total weight of the ink vehicle; and
ii) from about 1 to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal suboxides, one or more metal fluorides, or mixtures of these materials and comprises an at least partial surface treatment layer facing the environment, being in direct contact with the top layer of the one or more at least partial coating layers and made of one or more surface modifiers selected from fluoro compounds, said fluoro compounds being functionalized with one or more phosphor (P) containing groups or one or more silicon (Si) containing groups, the weight percent of i) and ii) being based on the total weight of UV-Vis radiation radically curable security ink.

Also described herein are uses of the UV-Vis radiation radically curable security inks described herein, preferably the UV-Vis radiation radically curable screen printing security inks described herein, for manufacturing one or more security features on a security document or article and security features obtained thereof.

Also described herein are security features made from the UV-Vis radiation radically curable security inks described herein, preferably the UV-Vis radiation radically curable screen printing security inks described herein.

Also described herein are articles comprising a substrate and a radiation cured coating obtained by radiation curing of the UV-Vis radiation radically curable security inks described herein, preferably the UV-Vis radiation radically curable screen printing security inks described herein.

Also described herein are methods for producing the article described herein, comprising the steps of
a. printing, preferably by a printing process selected from the group consisting of rotogravure processes, flexography processes and screen printing processes, more preferably selected from the group consisting of screen printing processes the UV-Vis radiation radically curable security inks described herein, preferably the UV-Vis radiation radically curable screen printing security inks described herein on the substrate, and
b. curing the UV-Vis radiation radically curable security ink so as to form one or more security features.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" means that the amount or value in question may be the value designated or some other value about the same. The phrases are intended to convey that similar values within a range of ±5% of the indicated value promote equivalent results or effects according to the invention.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

The present invention provides UV-Vis radiation radically curable security inks, preferably selected from the group consisting of UV-Vis radiation radically curable rotogravure security inks, UV-Vis radiation radically curable flexography security inks and UV-Vis radiation radically curable screen printing security inks and more preferably UV-Vis radiation radically curable screen printing security inks.

As known by those skilled in the art, the term rotogravure refers to a printing process which is described for example in *Handbook of Print Media*, Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing methods preferably use a unit with a chambered doctor blade, an anilox roller and plate cylinder. The anilox roller advantageously has small cells whose volume and/or density determines the ink or varnish application rate. The chambered doctor blade lies against the anilox roller, filling the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, 5$^{th}$ Edition, pages 359-360.

Screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminium or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3,000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 m/min in web or 10,000 sheets/hour in a sheet-fed process.

Screen printing is further described for example in *The Printing Ink Manual*, R. H. Leach and R. J. Pierce, Springer Edition, 5$^{th}$ Edition, pages 58-62, in *Printing Technology*, J. M. Adams and P. A. Dolin, Delmar Thomson Learning, 5$^{th}$ Edition, pages 293-328 and in *Handbook of Print Media*, H. Kipphan, Springer, pages 409-422 and pages 498-499.

The UV-Vis radiation radically curable security ink, preferably the UV-Vis radiation radically curable screen printing security ink, described herein comprises from about 75 to about 99 wt-% of an ink vehicle having a viscosity between about 200 and about 2000 mPas at 25° C. using a Brookfield viscometer (model "DV-I Prime", spindle S27 at 100 rpm for viscosities between 500 and 2500 mPas, spindle S27 at 50 rpm for viscosities equal to or higher than 2500 mPas and spindle S21 at 100 rpm for viscosities equal to or lower than 500 mPas). The ink vehicle described herein comprises a) from about 25 to about 55 wt-% of one or more radically curable oligomers having a molecular weight of at least 800 g/mol eq PS and b) from about 10 to about 50 wt-% of one or more radically curable monomers, the weight percents being based on the total weight of the ink vehicle.

Radically curable oligomers as used herein refers to relatively high molecular weight polymeric compounds having a weight average molecular weight (MW) higher than or equal to about 800 g/mol eq PS. The weight average molecular weights described herein are determined by GPC (gel permeation chromatography) according to the OECD test method 118, wherein a Malvern Viskotek GPCmax is used and wherein a calibration curve (log(molecular mass)=f(retention volume)) is established using six polystyrene standards (with molecular masses ranging from 472 to 512000 g/mol). During the measurements, the temperature was fixed at 35° C. and the samples contains 10 mg/mL of the product to be analyzed and being dissolved in THF (Acros, 99.9%, anhydrous). As described in the Examples herebelow, the samples are independently injected at a rate of 1 ml/min. The molecular mass of the polymer is calculated from the chromatogram as a polystyrene-equivalent weight average molecular weight (PS eq Mw), with a 95% confidence level and the average of three measurements of the same solution, using the following formula:

$$M_w = \frac{\sum_{i=1}^{n} H_i M_i}{\sum_{i=1}^{n} H_i}$$

where $H_i$ is the level of the detector signal from the baseline for the retention volume $V_i$, $M_i$ is the molecular weight of the polymer fraction at the retention volume $V_i$ and n is number of data points.

The radically curable oligomers described herein are preferably (meth)acrylate oligomers which may be branched or essentially linear, and the (meth)acrylate functional group or groups, respectively, can be terminal groups and/or pendant side groups bonded to the oligomer backbone. The term "(meth)acrylate" in the context of the present invention refers to the acrylate as well as the corresponding methacrylate. Preferably, the radically curable oligomers are (meth) acrylic oligomers, urethane (meth)acrylate oligomers, polyester (meth)acrylate oligomers, polyether based (meth) acrylate oligomers, amine modified polyether based (meth) acrylate oligomers or epoxy (meth)acrylate oligomers, more preferably urethane (meth)acrylate oligomers and epoxy (meth)acrylate oligomers. The functionality of the oligomer is not limited but is preferably not greater than 3.

Suitable examples of urethane (meth)acrylate oligomers include without limitation aliphatic urethane (meth)acrylate oligomers, in particular diacrylates, triacrylates, tetraacrylates and hexaacrylates, such as those sold by Sartomer under the grade number starting with CN90, CN92, CN93, CN94, CN95, CN96, CN98, CN99 and those sold by Allnex under the designation Ebecryl® 225, 230, 242, 244, 245, 246, 264, 265, 266, 267, 271, 280/1516, 284, 286, 294/25HD, 1258, 1291, 4101, 4141, 4201, 4250, 4220, 4265, 4396, 4397, 4491, 4513, 4666, 4680, 4683, 4738, 4740, 4820, 4858, 4859, 5129, 8110, 8209, 8254, 8296, 8307, 8402, 8465 and 8602; and aromatic (meth)acrylate oligomers, in particular diacrylates, triacrylates, tetraacrylates and hexaacrylates, such as those sold by Sartomer under the grade number starting with CN91 (except CN910A70) and grades starting with CN97 and those sold by Allnex under the designations Ebecryl®204, 205,206, 210, 214, 215, 220, 2221, 4501, 6203, 8232 and 8310. The urethane (meth) acrylate oligomers may be based upon polyethers or polyesters, which are reacted with aromatic, aliphatic, or cycloaliphatic diisocyanates and capped with hydroxy acrylates. Particularly suitable aliphatic urethane (meth)acrylate oligomers are sold by Rahn under the designation Genomer* 4316 and particularly suitable aromatic urethane (meth) acrylate oligomers are sold by Allnex under the designation Ebercryl® 2003.

Suitable examples of epoxy (meth)acrylate oligomers include without limitation aliphatic epoxy (meth)acrylate oligomers, in particular monoacrylates, diacrylates and triacrylates, and aromatic epoxy (meth)acrylate oligomers, in particular bisphenol-A (meth)acrylate oligomers, such as those sold by Sartomer under the grade number starting with 104, 109,1XX as well as CN2003EU, UVE150/80 and UVE151M; such as those sold by Allnex under the designation Ebecryl® 600, 604, 605, 609, 641, 646, 648, 812, 1606, 1608, 3105, 3300, 3203, 3416, 3420, 3608, 3639, 3700, 3701, 3702, 3703, 3708, 3730, 3740, 5848, 6040.

The ink vehicle described herein comprises b) from about 10 to about 50 wt-% of the one or more radically curable monomers described herein, the weight percents being based on the total weight of the ink vehicle, wherein said one more radically curable monomers are selected from the group consisting of triacrylates, tetraacrylates and mixtures thereof. Radically curable monomers as used herein refers to relatively low molecular weight compounds having a weight average molecular weight MW less than 800/mol eq PS as measured according to the method described herein.

The one or more radically curable monomers triacrylates described herein are selected from the group consisting of trimethylolpropane triacrylates, trimethylolpropane trimethacrylates, alkoxylated trimethylolpropane triacrylates, alkoxylated trimethylolpropane trimethacrylates, alkoxylated glycerol triacrylates, pentaerythritol triacrylates, alkoxylated pentaerythritol triacrylates and mixtures thereof, preferably selected from the group consisting of trimethylolpropane triacrylates, alkoxylated trimethylolpropane triacrylates, alkoxylated glycerol triacrylates, pentaerythritol triacrylates and mixtures thereof.

Particularly suitable trimethylolpropane triacrylates (CAS no. 15625-89-5) are sold by Allnex under the designation TMPTA, by Rahn under the designation Miramer M300 or by Sartomer under the designation SR351. Particularly suitable trimethylolpropane trimethacrylates (TMPTMA, CAS no. 3290-92-4) are sold by Sartomer under the designation SR350.

Preferably, the alkoxylated trimethylolpropane triacrylates described herein are selected from the group consisting of ethoxylated trimethylolpropane triacrylates (in particular selected form the group consisting of ethoxylated (EO3) trimethylolpropane triacrylates, ethoxylated (EO6) trimethylolpropane triacrylates, ethoxylated (EO9) trimethylolpropane triacrylates and mixtures thereof), propoxylated trimethylolpropane triacrylates and mixtures thereof; particularly suitable alkoxylated trimethylolpropane triacrylates (CAS no. 28961-43-5) are sold by Allnex under the designation Ebecryl® 160, by Rahn under the designation Miramer M360 (PO3 TMPTA), M3130 (EO3 TMPTA), M3160 (EO6 TMPTA), M3190 (EO9 TMPTA), or by Sartomer under the designation SR454 (EO3 TMPTA), SR492 (PO3 TMPTA) SR499 (EO6 TMPTA), SR502 (EO9 TMPTA).

Preferably, the alkoxylated trimethylolpropane trimethacrylates described herein are ethoxylated trimethylolpropane trimethacrylates, propoxylated trimethylolpropane trimethacrylates and mixtures thereof, more preferably selected from the group consisting of ethoxylated (EO3) trimethylolpropane tri trimethacrylates, ethoxylated (EO6) trimethylolpropane trimethacrylates, ethoxylated (EO9) trimethylolpropane trimethacrylates and mixtures thereof; particularly suitable ethoxylated trimethylolpropane trimethacrylates are sold by Eternal Materials under the designation EM3380 and EM3382.

Preferably, the alkoxylated glycerol triacrylates described herein are selected from the group consisting of ethoxylated glycerol triacrylates and propoxylated glycerol triacrylates and mixtures thereof, more preferably propoxylated glycerol triacrylates; particularly suitable propoxylated glycerol triacrylates (GPTA; CAS no. 52408-84-1) are sold by Rahn under the designation Miramer M320, by Allnex under the designation Ebecryl® 53, or by Sartomer under the designation SR9019, SR9020 and SR9021.

Particularly suitable pentaerythritol triacrylates (PETA, CAS no. 3524-68-3) are sold by Rahn under the designation Miramer M340, by Sartomer under the designation SR444D or by Allnex as a mixture of pentaerythritol triacrylate and tetraacrylate under the designation PETIA.

Preferably, the alkoxylated pentaerythritol triacrylates described herein are selected from the group consisting of ethoxylated pentaerythritol triacrylates, propoxylated pentaerythritol triacrylates and mixtures thereof, more preferably selected from the group consisting of ethoxylated (EO3) pentaerythritol triacrylates, ethoxylated (EO6) pentaerythritol triacrylates, ethoxylated (EO9) pentaerythritol triacrylates and mixtures thereof; particularly suitable ethoxylated pentaerythritol triacrylates are sold by Sartomer under the designation SR593.

The one or more radically curable monomers tetraacrylates described herein are selected from the group consisting of ditrimethylolpropane tetraacrylates, pentaerythritol tetraacrylates, alkoxylated pentaerythritol tetraacrylates and mixtures thereof, preferably selected from the group consisting of ditrimethylolpropane tetraacrylates, alkoxylated pentaerythritol tetraacrylates and mixtures thereof.

Particularly suitable ditrimethylolpropane tetraacrylates (DiTMPTA, CAS no. 94108-97-1) are sold by Allnex under the designation Ebecryl® 140, by Rahn under the designation Miramer M410 or by Sartomer under the designation SR355.

Particularly suitable pentaerythritol tetraacrylates (PETTA, CAS no. 4986-89-4) are sold by Miwon under the designation Miramer M420, by Sartomer under the designation SR295 or by Allnex as a mixture of pentaerythritol triacrylate and tetraacrylate under the designation PETIA.

Preferably, the alkoxylated pentaerythritol tetraacrylates described herein are selected from the group consisting of ethoxylated pentaerythritol tetraacrylates, propoxylated pentaerythritol tetraacrylates and mixtures thereof; particularly suitable ethoxylated pentaerythritol tetraacrylates (PPTTA, CAS no. 51728-26-8) are sold by Rahn under the designation M4004, by Sartomer under the designation SR494 or by Allnex under the designation Ebecryl® 50.

According to one embodiment, the ink vehicle described herein comprises the one or more radically curable monomers described herein, wherein said one more radically curable monomers are selected from the group consisting of the triacrylates described herein and mixtures thereof. According to another embodiment, the ink vehicle described herein comprises the one or more radically curable monomers described herein, wherein said one more radically curable monomers are selected from the group consisting of the tetraacrylates described herein. According to another embodiment, the ink vehicle described herein comprises the one or more radically curable monomers described herein, wherein said one more radically curable monomers are selected from the group consisting of the triacrylates described herein and the tetraacrylates described herein, i.e. a mixture of the triacrylates described herein and the tetraacrylates described herein.

The ink vehicle of the UV-Vis radiation radically curable security ink, preferably the UV-Vis radiation radically curable screen printing security ink, described herein further comprises from about 0.1 to about 20 wt-% of one or more photoinitiators, preferably about 1 to about 15 wt-%, the weight percents being based on the total weight of the ink vehicle. Radically curable inks or compositions are cured by free radical mechanisms consisting of the activation by energy of one or more photoinitiators which liberate free radicals which in turn initiate the polymerization. As known by those skilled in the art, the one or more photoinitiators are selected according to their absorption spectra and are selected to fit with the emission spectra of the radiation source. Depending on the monomers and oligomers used to prepare the ink vehicle comprised in the UV-Vis radiation radically curable security inks, preferably the UV-Vis radiation radically curable screen printing security inks, described herein, different photoinitiators might be used.

Suitable examples of free radical photoinitiators are known to those skilled in the art and include without limitation aminoketones (e.g. alpha-aminoketones), hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, and thioxanthones.

Suitable examples of alpha-hydroxyketones include without limitation (1-[4-(2-hydroxyethoxy)-phenyl]-2-hydroxy-2-methyl-1-propan-1-one) (CAS no. 106797-53-9); 1-hydroxycyclohexyl phenyl ketone (CAS no. 947-19-3); 2-hydroxy-2-methyl-1-phenylpropan-1-one (CAS no. 7473-98-5); 2-Hydroxy-2-methyl-1-(4-tert-butyl)phenylpropan-1-one (CAS no. 68400-54-4); 2-hydroxy-1-[4-[[4-(2-hydroxy-2-methylpropanoyl)phenyl]methyl]phenyl]-2-methylpropan-1-one (CAS no. 474510-57-1); 2-hydroxy-1-[4-[4-(2-hydroxy-2-methylpropanoyl)phenoxy]phenyl]-2-methylpropan-1-one (CAS no. 71868-15-0); and oligo[2-hydroxy-2-methyl-1-[4-(1-methylvinyl)phenyl]propanone] (CAS no. 163702-01-0).

Suitable examples of alpha-amino ketones include those containing a benzoyl moiety, otherwise called alpha-amino acetophenones, for example 2-methyl-1-[4-(methylthio)phenyl]-2-morpholinopropan-1-one (CAS no. 71868-10-5); 2-benzyl-2-dimethylamino-1-(4-morpholino-phenyl)-butan-1-one (CAS no. 119313-12-1); and 2-dimethylamino-2-(4-methyl-benzyl)-1-(4-morpholin-4-yl-phenyl)-butan-1-one (CAS no. 119344-86-4).

Suitable examples of acetophenones include without limitation 2,2-diethoxyacetophenone (CAS 6175-45-7); 2-ethylhexy-4-dimethylaminobenzoate (CAS no. 21245-02-3); and 2-methoxy-2-phenylacetophenone (CAS 3524-62-7).

Suitable examples of benzophenones include without limitation benzophenone (CAS no. 119-61-9); polymeric benzophenone derivatives; 2-methylbenzophenone (CAS no. 131-58-8); 3-methylbenzophenone (CAS no. 643-65-2); 4-methylbenzophenone (CAS no. 134-84-9); 2,4,6-trimethylbenzophenone (CAS no. 954-16-5); 3,3'-dimethyl-4-methoxybenzophenone (CAS no. 41295-28-7); 4-phenylbenzophenone (CAS no. 2128-93-0); 4-chlorobenzophenone (CAS no. 134-85-0); 4,4'-bis(diethylamino)benzophenone (CAS no. 90-93-7); methyl-2-benzoylbenzoate (CAS no. 606-28-0); 4-(4-methylphenylthio)benzophenone (CAS no. 83846-85-9); 4-hydroxybenzophenone laurate (CAS no. 142857-24-7), and a mixture of 50% benzophenone (CAS 119-61-9) and 50% 1-hydroxycyclohexyl phenyl ketone (CAS no. 947-19-3).

A suitable example of ketosulfone include without limitation 1-[4-(4-benzoylphenylsulfanyl)phenyl]-2-methyl-2-(4-methylphenylsulfonyl)propan-1-one (CAS no. 272460-97-6).

A suitable example of benzyl ketals includes without limitation 2,2-dimethoxy-2-phenylacetophenone (CAS no. 24650-42-8).

Suitable examples of benzoin ethers include without limitation 2-ethoxy-1,2-diphenylethanone, (CAS no. 574-09-4); 2-isopropoxy-1,2-diphenylethanone (CAS no. 6652-28-4); 2-isobutoxy-1,2-diphenylethanone (CAS no. 22499-12-3); 2-butoxy-1,2-diphenylethanone (CAS no. 22499-11-2); 2,2-dimethoxy-1,2-diphenylethanone (CAS no. 24650-42-8); and 2,2-diethoxyacetophenone (CAS no. 6175-45-7)

Suitable examples of phosphine oxides include without limitation 2,4,6-trimethylbenzoyldiphenylphosphine oxide (CAS no. 75980-60-8); ethyl (2,4,6-trimethylbenzoyl)phenylphosphinate (CAS no. 84434-11-7); phenylbis(2,4,6-trimethylbenzoyl)phosphine oxide (CAS no. 162881-26-7); bis(2,6-dimethoxybenzoyl)-2,4,4-trimethylpentylphosphine oxide (CAS no. 145052-34-2); substituted acyl-phosphine oxides (CAS no. not available) sold as Speedcure XKm from Lambson; a mixture of diphenyl(2,4,6-trimethylbenzoyl)phosphine oxide (CAS no. 75980-60-8) and 2-hydroxy-2-methylpropiophenone (CAS no. 7473-98-5), a mixture of phenylbis(2,4,6-trimethylbenzoyl)phosphine oxide (CAS no. 162881-26-7) and 2-hydroxy-2-methylpropiophenone (CAS no. 7473-98-5); and a mixture of ethyl(2,4,6-trimethylbenzoyl)phenylphosphinate (CAS no. 84434-11-7) and 2-hydroxy-2-methylpropiophenone (CAS no. 7473-98-5).

Suitable examples of thioxanthones include without limitation 2-methyl thioxanthone (CAS no. 15774-82-0); 2,4-diethylthioxanthone (CAS no. 82799-44-8); 2-isopropylthioxanthone (CAS no. 5495-84-1); 1-chloro-4-propoxythioxanthone (CAS no. 142770-42-1); and polymeric thioxanthone derivatives.

Suitable examples of phenylglyoxylates include without limitation methyl benzoylformate (CAS no. 15206-55-0); 2-[2-oxo-2-phenyl-acetoxy-ethoxy]ethyl 2-oxo-2-phenylacetate (CAS no. 211510-16-6); and a mixture of 2-[2-oxo-2-phenyl-acetoxy-ethoxy]ethyl 2-oxo-2-phenylacetate (CAS no. 211510-16-6) and oxy-phenyl-acetic acid 2-[2-hydroxy-ethoxy]-ethyl ester (CAS no. 442536-99-4).

Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

The ink vehicle of the UV-Vis radiation radically curable security ink, preferably the UV-Vis radiation radically curable screen printing security ink, described herein may further comprise from about 0% to about 50 wt-%, preferably from about 0% to 40% and more preferably from about 0% to 30% of one or more reactive diluents being radically curable monomers selected from mono(meth)acrylates, di(meth)acrylates and mixtures thereof, the weight percent being based on the total weight of the ink vehicle or UV-Vis radiation radically curable security ink as the case may be.

According to one embodiment, the UV-Vis radiation radically curable security ink, preferably the UV-Vis radiation radically curable screen printing security ink, described herein comprises one or more reactive diluents being mono(meth)acrylates. According to another embodiment, the UV-Vis radiation radically curable security ink, preferably the UV-Vis radiation radically curable screen printing security ink, described herein comprises one or more reactive diluents being di(meth)acrylates. According to another embodiment, the UV-Vis radiation radically curable security ink, preferably the UV-Vis radiation radically curable screen printing security ink, described herein comprises one or more reactive diluents being mono(meth)acrylates and one or more reactive diluents being di(meth)acrylates.

The one or more monoacrylates and diacrylates described herein refers to relatively low molecular weight compounds having a weight average molecular weight MW less than 800 g/mol eq PS as measured according to the method described herein.

Suitable mono(meth)acrylates may be selected from the group consisting of alkyl (meth)acrylates, cycloalkyl (meth)acrylates, benzyl (meth)acrylates, phenyl (meth)acrylates, and aliphatic urethane (meth)acrylates. A suitable example is sold by Rahn under the designation Genomer* 1122.

Particularly suitable alkyl acrylates include without limitation octyl acrylate (CAS no. 2499-59-4); decyl acrylate (CAS no. 2156-96-9); lauryl acrylate (CAS no. 2156-97-0), tridecyl acrylate (CAS no. 3076-04-8); isodecyl acrylate (CAS no. 1330-61-6); stearyl acrylate (CAS no. 4813-57-4), 2-(2-ethoxyethoxy)ethyl acrylate (CAS no. 7328-17-8). Particularly suitable alkyl methacrylates include without limitation lauryl methacrylate (CAS no. 142-90-5), tridecyl methacrylate (CAS no. 2495-25-2); tetradecyl methacrylate (CAS no. 2549-53-3); isodecyl methacrylate (CAS no. 29964-84-9); stearyl methacrylate (CAS no. 32360-05-7).

Particularly suitable cycloalkyl acrylates include without limitation 3,3,5-trimethylcyclohexyl acrylate (CAS no. 86178-38-3); isobornyl acrylate (CAS no. 5888-33-5); 4-tert-butylcyclohexyl acrylate (CAS no. 84100-23-2); (5-ethyl-1,3-dioxan-5-yl)methyl acrylate (CAS no. 66492-51-1); tetrahydrofurfuryl acrylate (CAS no. 2399-48-6); 2-(1,2-cyclohexadienyldicarboximide)ethyl acrylate (CAS no. 106646-48-4); 4-cyclohexene-1,2-dicarboximide, N-(2-hydroxyethyl)-, acrylate (CAS no. 15458-80-7); and acryloylmorpholine (CAS no. 5117-12-4). Particularly suitable cycloalkyl methacrylates include without limitation glycidyl methacrylate (CAS no. 106-91-2); isobornyl methacrylate (CAS no. 7534-94-3); and tetrahydrofurfuryl methacrylate (CAS no. 2455-24-5).

Particularly suitable benzyl and phenyl acrylates include without limitation benzyl acrylate (CAS no. 2495-35-4); 2-phenoxyethyl acrylate (CAS no. 48145-04-6); mixtures of 2-phenoxyethyl acrylate (CAS no. 48145-04-6) and ethoxylated (EO4) phenol acrylate (CAS no. 56641-05-5); mixtures of ethoxylated (EO4) phenol acrylate (CAS no. 56641-05-5) and ethoxylated (EO8) nonylphenol acrylate (CAS no. 50974-47-5); propoxylated (PO2) nonylphenol acrylate (CAS no. 71926-19-7); ethoxylated o-phenylphenol acrylate (CAS no. 72009-86-0); p-cumylphenoxyethyl acrylate (CAS no. 86148-08-5); dicyclopentenyl acrylate (CAS no. 33791-58-1); and dicyclopentenyloxyethyl acrylate (CAS no. 65983-31-5). Particularly suitable benzyl and phenyl methacrylates include without limitation benzyl methacrylate (CAS no. 2495-37-6); and phenoxyethyl methacrylate (CAS no. 10595-06-9).

Particularly suitable aliphatic urethane acrylates include without limitation 2-(N-butylcarbamoyloxy)ethyl acrylate (CAS no. 63225-53-6).

Suitable diacrylates include without limitation ethylene glycol diacrylate (CAS no. 2274-11-5); 1,4-butanediol diacrylate (CAS no. 1070-70-8); 1,3-butanediol diacrylate (CAS no. 19485-03-1); 2-methyl-1,3-propanediol diacrylate (CAS no. 86168-86-7), 3-methyl-1,5-pentanediol diacrylate (CAS no. 64194-22-5); 2-butyl-2-ethyl-1,3-propanediol diacrylate (CAS no. 67019-04-9), 1,6-hexanediol diacrylate (CAS no. 13048-33-4); neopentyl glycol diacrylate (CAS no. 2223-82-7); 1,9-nonanediol diacrylate (CAS no. 107481-28-7); ethoxylated 1,6-hexanediol diacrylates (CAS no. 84170-27-4); propoxylated 1,6-hexanediol diacrylates (CAS no. 84170-73-0); propoxylated neopentyl glycol diacrylate (CAS no. 84170-74-1); ethoxylated 2-methyl-1,3-propanediol diacrylate (CAS no. 634592-28-2); tricyclodecanedimethanol diacrylate (CAS no. 42594-17-2); diethylene glycol diacrylate (CAS no. 4074-88-8); dipropylene glycol diacrylate (CAS no. 57472-68-1); triethylene glycol diacrylate (CAS no. 1680-21-3); tripropylene glycol diacrylate (CAS no. 42978-66-5); tetraethylene glycol diacrylate (CAS no. 17831-71-9); polyethylene glycol 200/400/600 diacrylates (CAS no. 26570-48-9); and ethoxylated (EO2/EO3/EO4/EO10) bisphenol A diacrylates (CAS no. 64401-02-1).

Suitable dimethacrylates include without limitation ethylene glycol dimethacrylate (CAS no. 97-90-5); 1,4-butanediol dimethacrylate (CAS no. 2082-81-7); 1,3-butanediol dimethacrylate (CAS no. 1189-08-8); 1,6-hexanediol dimethacrylate (CAS no. 6606-59-3); neopentyl glycol dimethacrylate (CAS no. 1985-51-9); 1,9-nonanediol diacrylate (CAS no. 107481-28-7); diethylene glycol dimethacrylate (CAS no. 2358-84-1); triethylene glycol dimethacrylate (CAS no. 109-16-0); tetraethylene glycol dimethacrylate (CAS no. 109-17-1); polyethylene glycol 200/400/600 dimethacrylate (CAS no. 25852-47-5); and ethoxylated (EO2/EO3/EO4/EO10) bisphenol A dimethacrylates (CAS no. 41637-38-1).

The ink vehicle or the UV-Vis radiation radically curable security ink, preferably the UV-Vis radiation radically curable screen printing security ink, described herein may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 to about 20 wt-%, more preferably in an amount from about 0.1 to about 10 wt-%, the weight percents being based on the total weight of the ink vehicle or the UV-Vis radiation radically curable security ink.

The ink vehicle or the UV-Vis radiation radically curable security ink, preferably the UV-Vis radiation radically curable screen printing security ink, described herein may further comprise one or more marker substances and/or taggants including forensic markers and/or forensic taggants and/or one or more machine readable materials selected from the group consisting of magnetic materials known in the art, luminescent materials known in the art, electrically conductive materials known in the art, infrared-absorbing materials known in the art and (surface enhanced) Raman active compounds known in the art. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The ink vehicle or the UV-Vis radiation radically curable security ink, preferably the UV-Vis radiation radically curable screen printing security ink, described herein may further comprise one or more coloring components selected from the group consisting of organic pigment particles, inorganic pigment particles, organic dyes and mixtures thereof; and/or one or more additives. The latter include without limitation compounds and materials which are used for adjusting physical, rheological and chemical parameters of the UV-Vis radiation radically curable security ink, preferably the UV-Vis radiation radically curable screen printing security ink, described herein such as the consistency (e.g. anti-settling agents and plasticizers), the foaming properties (e.g. antifoaming agents and deaerators), the lubricating properties (waxes), etc. Additives described herein may be present in the ink vehicle or the UV-Vis radiation radically curable security ink, preferably the UV-Vis radiation radically curable screen printing security ink, described herein in amounts and in forms known in the art, including in the form of so-called nano-materials where at least one of the dimensions of the additives is in the range of 1 to 1000 nm.

The UV-Vis radiation radically curable security inks, preferably the UV-Vis radiation radically curable screen printing security inks, described herein comprise from about 1 to about 25 wt-% of the non-metallic or metallic flakes described herein.

The pigments described herein comprise the flake-shaped non-metallic or metallic substrate which is at least partially coated with the one or more at least partial coating layers described herein and comprises the at least partial surface treatment layer facing the environment and made of one or more surface modifiers described herein. By "facing the environment", it is meant that said surface treatment layer is the topmost layer of the pigments and acts as an outer layer. The at least partial surface treatment layer is in direct contact with the top layer of the one or more at least partial coating layers described herein.

The flake-shaped non-metallic or metallic substrate of the pigments described herein comprises one or more at least partial coatings independently made of one or more metal oxides, one or more metal oxide hydrates, one or more metal suboxides, one or more metal fluorides or mixtures of these materials; in other words, the non-metallic or metallic flakes described herein are at least partially coated with one or more layers made of one or more metal oxides, one or more metal oxide hydrates, one or more metal suboxides, one or more metal fluorides or mixtures of these materials.

The thickness of the metal oxide, metal oxide hydrate, metal suboxide, metal, metal fluoride, metal nitride, metal oxynitride layers or a mixture thereof is usually 5 to 1000 nm, preferably 10 to 800 nm, in particular 20 to 600 nm.

As known by the man skilled in the art, the one or more at least partial coatings may be applied to the flake-shaped non-metallic or metallic substrate by precipitation methods, wet-chemical methods, sol-gel methods physical vapor deposition (PVD) processes or chemical vapor deposition (CVD) processes, wherein said methods are chosen as a function of the substrate materials and the coating materials. Alternatively, the one or more at least partial coatings made of metal oxides and/or oxide hydrates may be obtained on flake-shaped metallic substrates by chemical oxidation of the metal surface (e.g. with permanganate or other strong oxidation agents) or by heating the flake-shaped metallic pigment in air or in a controlled atmosphere (e.g. enriched in oxygen and/or in water vapor) at elevated temperature during a given amount of time, the time, temperature and atmosphere composition depending on the metal and on the desired thickness of the at least partial coatings. For example, the flake-shaped metallic pigment may be baked in an oven at 300° C. in dry air for 30 minutes in order to get the at least partial coatings made of metal oxide and/or metal hydrate The size of the pigments, expressed by the D50 value, described herein used is preferably in the range from about 1 to about 100 µm, preferably from about 5 to about 50 µm. The thickness of the pigments is usually between 0.1 and 5 µm, preferably between 0.2 and 4 µm.

According to one embodiment, the flake-shaped non-metallic substrate of the pigments described herein is preferably made of one or more materials selected from the group consisting of natural micas, synthetic micas, talcs, graphites, borosilicates (e.g. glasses) and kaolins, more preferably selected from the group consisting of natural micas, synthetic micas and glasses and still more preferably selected from the group consisting of natural micas and synthetic micas.

The flake-shaped non-metallic substrate described herein comprises one or more at least partial coatings independently made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide, titanium oxide and any mixtures thereof. Preferably, the non-metallic substrate described herein consists of a non-metallic substrate, preferably natural micas or synthetic micas, comprising one or more at least partial coatings independently made of one or more metal oxides selected from the group consisting of titanium dioxides, tin oxides, iron oxide, chromium oxide and mixtures thereof. Particularly preferred flake-shaped non-metallic substrates for the pigments described herein consist of natural micas or synthetic micas comprising one or more at least partial coatings independently made of titanium dioxide (i.e. flake-shaped mica substrate+$TiO_2$) or a mixture comprising titanium dioxide as well as natural or synthetic micas comprising more than one at least partial coatings, wherein one of said one or more at least partial coatings is made of titanium dioxide and another one of said one or more at least partial coatings is made of tin oxide (i.e. flake-shaped mica substrate+$SnO_2$+$TiO_2$ or flake-shaped mica substrate+$TiO_2$+$SnO_2$).

According to one embodiment, the flake-shaped metallic substrate of the pigments described herein consists of a monolayer made of one or more metals preferably selected from the group consisting of aluminum, copper, zinc, tin, brass, iron, titanium, chromium, nickel, silver, gold, steel, alloys thereof and mixtures thereof preferably selected from the group consisting of aluminum, iron and brass. The flake-shaped metallic substrate described herein comprises one or more at least partial coatings independently made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide and titanium oxide.

According to one embodiment, the flake-shaped metallic substrate of the pigments described herein consists of a three layer structure made of one or more metals preferably independently selected from the group consisting of aluminum, copper, zinc, tin, brass, iron, titanium, chromium, nickel, silver, gold, steel, alloys thereof and mixtures thereof preferably independently selected from the group consisting of aluminum, chromium, iron, alloys thereof and mixtures thereof. The flake-shaped metallic substrate described herein comprises one or more at least partial coatings independently made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide and titanium oxide. Suitable examples of flake-shaped metallic substrates include three layer structures are Al/M/Al, wherein M is iron or a mixture of iron and chromium and wherein said flake-shaped metallic substrates comprise one or more at least partial coatings made of one or more metal fluorides, preferably magnesium fluoride.

According to one embodiment, the flake-shaped metallic substrate of the pigments described herein consists of a multilayer comprising one or more metallic layers and optionally one or more non-metallic layers.

According to one preferred embodiment, the flake-shaped metallic substrate of the pigments described herein consists of a multilayer comprising one or more metallic layers and optionally one or more non-metallic layers being thin film interference multilayers comprising a Fabry-Perot reflector/dielectric/absorber multilayer structures such as those disclosed in U.S. Pat. Nos. 4,705,300; 4,705,356; 4,721,271; 5,084,351; 5,214,530; 5,281,480; 5,383,995; 5,569,535, 5,571624 and in the thereto related documents. Preferably, the multi layers comprising one or more metallic layers described herein are thin film interference pigments comprising a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum, chromium, nickel, and mixtures thereof and still more preferably aluminum. Preferably, the dielectric layers are independently selected from the group consisting of magnesium fluoride, silicon dioxide and mixtures thereof and more preferably magnesium fluoride. Preferably, the absorber layers are independently selected from the group consisting of chromium, nickel, metallic alloys and mixtures thereof and more preferably chromium. Particularly preferred thin film interference multilayers comprise a Fabry-Perot absorber/dielectric/reflector/dielectric/absorber multilayer structure comprising a Cr/$MgF_2$/Al/$MgF_2$/Cr multilayer structure. The flake-shaped metallic substrate of the pigments described herein consisting of a thin film interference multilayer further comprises an at least partial coating made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Preferred metal oxides are aluminum oxides, silicon oxide, iron oxides, tin oxide, cerium oxide, zinc oxide, zirconium oxide, chromium oxide and titanium oxide, preferably chromium oxide and mixtures thereof.

The non-metallic or metallic substrate further comprises the at least partial surface treatment layer described herein, wherein said surface treatment layer faces the environment and is in direct contact with the top layer of the one or more at least partial coating layers. In other words, the at least partial surface treatment layer described herein is present on the top layer coating of the one or more at least partial coatings. The at least partial surface treatment layer described herein is made of one or more surface modifiers selected from functionalized fluoro compounds, said fluoro compounds being functionalized with phosphor (P) containing compounds or silicon (Si) containing compounds. The functionalized fluoro compounds described herein are preferably functionalized with one or more phosphate containing groups, one or more silane containing groups or one or more siloxane containing groups.

The surface modification can take place in a variety of ways. For example, the one or more surface modifiers described herein may be dissolved in an organic solvent and/or water and are subsequently applied to the flake-shaped non-metallic or metallic substrates comprising the one or more at least partial coating layers described herein by mixing and subsequently the so-obtained pigments are dried. Alternatively, the surface treatment with the one or more surface modifiers may take place immediately after the flake-shaped non-metallic or metallic substrate has been at least partially coated with the one or more at least partial coating layers described herein in a one-pot process. An optional calcination step may be carried out on the flake-shaped non-metallic or metallic substrates comprising the one or more at least partial coating layers described herein prior to the surface treatment.

The one or more surface modifiers described herein preferably have a weight average molecular weight below about 2000 g/mol eq PS as measured according to the method described herein.

According to one embodiment, the one or more surface modifiers described herein are fluoro containing compounds being perfluoropolyether compounds being functionalized with one or more phosphor (P) containing groups or one or more silicon (Si) containing groups, in particular perfluoropolyether compounds having one or more phosphate groups or perfluoropolyether compounds having one or more silane groups or perfluoropolyether compounds having one or more siloxane groups.

According to one embodiment, the one or more surface modifiers described herein consist of perfluoropolyether compounds (i.e. comprising the structure —CH$_2$O—(CF$_2$)$_m$—(CF$_2$—CF$_2$—O)$_n$—CF$_2$—) being mono- or bifunctionalized with one or more phosphate groups, preferably phosphoric or phosphonic ester groups, more preferably alkoxylated perfluoropolyether compounds derivatives having phosphate groups, preferably phosphoric or phosphonic ester groups. Preferably, the one or more surface modifiers described herein are perfluoropolyether compounds of the following formula (I):

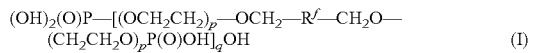

(I)

wherein p=1-2, q=1-4 and R$^f$ is CH$_2$O—(CF$_2$)$_m$—(CF$_2$—CF$_2$—O)$_n$—CF$_2$. A particularly suitable example of surface modifiers for the present invention is commercially available under the name Fluorolink® P54 from Solvay.

According to another embodiment, the one or more surface modifiers described herein are perfluoropolyether compounds functionalized with one or more silane groups, preferably alkoxylated silane groups. Preferably, the one or more surface modifiers described herein consist of perfluoropolyether compounds derivatives of the following formula (II):

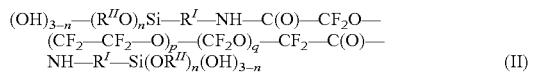

(II)

wherein R$^I$ is alkylene from 1 to 10 carbon atoms, preferably from 1 to 5 carbon atoms, still more preferably from 2 to 4 carbon atoms; R$^{II}$ is a linear or branched alkyl group from 1 to 4 carbon atoms, preferably from 1 to 3 carbon atoms; n is an integer from 0 to 3, preferably 3; p and q are numbers such that the q/p ratio is between 0.2 and 4; and p is different from zero. Preferably, the one or more surface modifiers described herein are perfluoropolyether compounds functionalized with silane groups of the following formula (III):

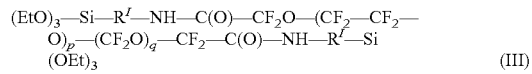

(III)

wherein R$^I$ is alkylene from 1 to 10 carbon atoms, preferably from 1 to 5 carbon atoms, still more preferably from 2 to 4 carbon atoms and p and q are numbers such that the q/p ratio is between 0.2 and 4; and p is different from zero. A particularly suitable example of surface modifiers for the present invention is commercially available under the name Fluorolink® S10 from Solvay with the following formula (IV):

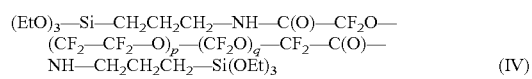

(IV)

wherein p=2-6 and q=2-4.

According to one embodiment, the one or more surface modifiers described herein consists of fluoro containing compounds being fluoroalkyl compounds being functionalized with one or more phosphor (P) containing groups or one or more silicon (Si) containing groups, in particular fluoroalkyl compounds having one or more phosphate groups or fluoroalkyl compounds having one or more siloxane groups.

According to one embodiment, the one or more surface modifiers described herein consist of fluoroalkyl compounds being functionalized with one or more phosphate groups, preferably according to the formula: (R$^f$C$_n$H$_{2n}$O)$_m$PO(OM)$_{3-m}$ or (R$^f$SO$_2$NRC$_n$H$_{2n}$O)$_m$PO(OM)$_{3-m}$, wherein R$^f$ is the same or different and represents a linear or branched C3 to C21 fluoroalkyl group, perfluoroalkyl group, fluoroxyalkyl group or perfluoroxyalkyl group, n is 1 to 12, m is 1 to 3, M represents hydrogen, alkali metal, ammonium group or substituted ammonium group, and R represents hydrogen or alkylene from 1 to 3 carbon atoms.

According to one embodiment, the one or more surface modifiers described herein consist of fluoroalkyl compounds being functionalized with one or more siloxanes groups.

Suitable examples of fluoroalkyl compounds being functionalized with one or more siloxanes groups include organosiloxanes which has at least one triamino group of formula [NH$_x$(CH$_2$)$_a$NH$_y$(CH$_2$)$_b$NH$_z$]—, wherein the group is bonded to at least one silicon atom via at least one N-bonded alkylene group having 1 to 4 C atoms, a and b are identical or different and are an integer ranging from 1 to 6, x is 0 or 1 or 2, y is 0 or 1, z is 0 or 1 or 2, with the proviso that (x+y+z)≤4, and at least one Si—C- bonded fluoroalkyl group of formula: F$_3$C(CF$_2$)$_r$(CH$_2$)$_s$—, wherein r is 0 or an integer ranging from 1 to 18 and s is 0 or 2.

Other suitable examples of fluoroalkyl compounds being functionalized with one or more siloxanes groups include the following compounds:

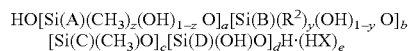

wherein A is an aminoalkyl group derived from a compound of formula: H$_2$N(CH$_2$)$_f$(NH)$_g$(CH$_2$)$_h$Si(OR)$_{3-z}$(CH$_3$)$_z$ wherein 0≤f≤6, g=0 if f=0 and g=1 if f>0, 0≤h≤6 and 0≤z1;
B is a fluoroalkyl group derived from a compound of formula R$^1$—Y$_m$—(CH$_2$)$_2$Si(R$^2$)y (OR)$_{3-y}$,
wherein R$^1$ is a mono-, oligo- or perfluorinated alkyl group having 1-9 C atoms or a mono-, oligo- or perfluorinated aryl group, Y is a CH$_2$, O or S group, R$^2$ is a linear, branched or cyclic alkyl group having 1-8 C atoms or an aryl group, m is 0 or 1, and 0≤y≤1;

C is an alkyl group derived from a compound of formula R³—Si(CH₃)(OR)₂,
and D is an alkyl group derived from a compound of formula R—Si(OR)₃,
wherein $R^3$, in each case is identical or different, and is a linear, branched or cyclic alkyl group having 1-8 C atoms, and R, in each case is identical or different, and is a linear, branched or cyclic alkyl group having 1-8 C atoms or an aryl group;
and HX is an acid, wherein X is an inorganic or organic acid radical, and
$0 \leq y \leq 1$, $0 \leq z \leq 1$, $a > 0$, $b > 0$, $c \geq 0$, $d \geq 0$, $e \geq 0$ and $(a+b+c+d) \geq 2$.

Other suitable examples of fluoroalkyl compounds being functionalized with one or more siloxanes groups include the following compounds:

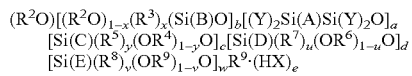

wherein A corresponds to a bisaminoalkyl radical; B corresponds to an aminoalkyl radical; C corresponds to an alkyl radical; D corresponds to an epoxy or ether radical and corresponds to an organofunctional radical, preferably E-Si $(R^8)_v(OR^9)_{3-v}$; Y corresponds to $OR^1$ or, in crosslinked and/or three-dimensionally crosslinked structures, independently of one another, $OR^1$ or $O_{1/2}$, $R^1$, $R^2$, $R^4$, $R^6$ and/or $R^9$ substantially correspond to hydrogen and $R^3$, $R^5$, R and/or $R^8$ correspond to organofunctional radicals, and HX being an acid, in which X is an inorganic or organic acid radical, and wherein $0 \leq x \leq 1$, $0 \leq y \leq 1$, $0 \leq u \leq 1$, $a \geq 1$, $b \geq 0$, $c \geq 0$, $d \geq 0$, $w \geq 0$, $e \geq 0$ and $(a+b+c+d+w) \geq 2$.

The present invention further provides methods for producing the UV-Vis radiation radically curable inks, preferably the UV-Vis radiation radically curable screen printing inks, described herein and inks obtained therefrom. The UV-Vis radiation radically curable inks, preferably the UV-Vis radiation radically curable screen printing inks, described herein may be prepared by dispersing or mixing i) the components of the ink vehicle described herein, i.e. one or more radically curable oligomers described herein, the one or more radically curable monomers selected from the group consisting of the triacrylates, tetraacrylates, and mixtures thereof described herein, the one or more free radical photoinitiators described herein and the optional additives described herein, with ii) the pigments described herein, wherein all of said compounds may be dispersed or mixed in a single step or wherein the ink vehicle is first prepared and then the pigments described herein are added and the so-obtain mixture is dispersed or mixed. The one or more photoinitiators described herein may be added either during the dispersing or mixing step of all other ingredients or may be added at a later stage, i.e. after the formation of the inks.

The UV-Vis radiation radically curable inks, preferably the UV-Vis radiation radically curable screen printing inks, described herein are applied on the substrate described herein for producing a security feature by a printing process preferably selected from the group consisting of rotogravure processes, flexography processes screen printing processes, more preferably selected from the group consisting of screen printing processes.

The present invention further provides methods for producing the security features described herein and security features obtained thereof. The method comprises a step a) of printing, preferably a printing process selected from the group consisting of rotogravure processes, flexography processes screen printing processes, more preferably selected from the group consisting of screen printing processes, the UV-Vis radiation radically curable security ink described herein onto the substrate described herein and a step b) of curing the UV-Vis radiation radically curable security ink in the presence of UV-Vis radiation is carried out so as to form one or more security features such as those described herein. Preferably, the method described herein comprises a step a) of printing by a screen printing process the UV-Vis radiation radically curable screen printing security ink described herein onto the substrate described herein and a step b) of curing the UV-Vis radiation radically curable screen printing security ink in the presence of UV-Vis radiation is carried out so as to form one or more security features such as those described herein. The present invention further provides security features made of the UV-Vis radiation radically curable security inks, preferably the UV-Vis radiation radically curable screen printing security inks, described herein on the substrate described herein.

The substrates described herein are preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum, chromium, copper, gold, silver, alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc.

The present invention further provides security documents comprising the substrate described herein and the security feature described herein or security documents comprising more than one of the security features described herein. Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents, right-conferring documents, driving licenses, credit cards, access cards, transportation titles, vouchers and secured product labels. Alternatively, the security features described herein may be produced onto an auxiliary substrate such as for example a security thread, security stripe, a foil, a decal, a window or a label and consequently transferred to a security document in a separate step.

With the aim of further increasing the security level and the resistance against counterfeiting and illegal reproduction of security documents, the substrate described herein may contain printed, coated, or laser-marked or laser-perforated indicia, watermarks, security threads, fibers, planchettes, luminescent compounds, windows, foils, decals, primers and combinations of two or more thereof.

With the aim of increasing the durability through soiling or chemical resistance and cleanliness and thus the circulation lifetime of security documents or with the aim of modifying their aesthetical appearance (e.g. optical gloss), one or more protective layers may be applied on top of the security features or security document described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable. More preferably UV-Vis curable compositions.

The security features described herein may be provided directly on a substrate on which it shall remain permanently (such as for banknote applications). Alternatively, a security feature may also be provided on a temporary substrate for production purposes, from which the security feature is subsequently removed. Thereafter, after hardening/curing of the UV-Vis radiation radically curable security inks, preferably the UV-Vis radiation radically curable screen printing security inks, described herein for the production of the security feature, the temporary substrate may be removed from the security feature.

Alternatively, in another embodiment an adhesive layer may be present on the security feature or may be present on the substrate comprising said security feature, said adhesive layer being on the side of the substrate opposite to the side where the security feature is provided or on the same side as the security feature and on top of the security feature. Therefore an adhesive layer may be applied to the security feature or to the substrate, said adhesive layer being applied after the curing step has been completed. Such an article may be attached to all kinds of documents or other articles or items without printing or other processes involving machinery and rather high effort. Alternatively, the substrate described herein comprising the security feature described herein may be in the form of a transfer foil, which can be applied to a document or to an article in a separate transfer step. For this purpose, the substrate is provided with a release coating, on which the security feature are produced as described herein. One or more adhesive layers may be applied over the so produced security feature.

Also described herein are substrates, security documents, decorative elements and objects comprising more than one, i.e. two, three, four, etc. security feature described herein. Also described herein are articles, in particular security documents, decorative elements or objects, comprising the security feature described herein.

As mentioned hereabove, the security features described herein may be used for protecting and authenticating a security document or decorative elements.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

The skilled person can envisage several modifications to the specific embodiments described above without departing from the spirit of the present invention. Such modifications are encompassed within the present invention.

Further, all documents referred to throughout this specification are hereby incorporated by reference in their entirety as set forth in full herein.

EXAMPLES

The present invention is now described in more details with reference to non-limiting examples. The Examples below provide more details for the preparation and properties of UV-Vis curable screen printing security inks and security features obtained thereof.

Two series of screen printing security inks have been prepared and applied on a substrate.

E1-E6 have been prepared with different flakes, wherein the surface of said flakes has been independently treated with different compounds so as to provide a surface treatment layer on said flakes. Table 1 provides a description of the flakes. Table 2A provides a description of the solvent-based ink vehicle used to prepare comparative solvent-based screen printing security inks (C1, C3, C5 and C9) according to the prior art such as for example U.S. Pat. No. 8,147,932.

Table 2B provides a description of a UV-Vis curable ink vehicle used to prepare UV-Vis curable screen printing security inks (E1-E6) according to the invention and to prepare comparative UV-Vis curable screen printing security inks (C2, C4, C6, C7, C8 and C10). Tables 2C-1 and 2C-2 provide optical properties of security features made from the UV-Vis curable screen printing security inks (E1-E6) according to the present invention, made from the comparative UV-Vis curable screen printing security inks (C2, C4, C6, C7, C8 and C10) and made from the comparative solvent-based screen printing security inks (C1, C3, C5 and C9) according to the prior art.

E7-E34 and C11-C19 have been prepared with flakes being 5-layers thin film interference pigments (i.e. optically variable pigments) (ChromaFlair®) (flakes P1b), wherein the surface of said flakes have been treated with Fluorolink® P54 (perfluoropolyether functionalized with phosphor (P) containing compounds, in particular with phosphate containing groups) so as to provide a surface treatment layer on said flakes. Tables 3A-9A provide a description of ink vehicles used to prepare UV-Vis curable screen printing security inks (E7-E34) according to the invention and to prepare comparative UV-Vis curable screen printing security inks (C11-C19). Tables 3B-9B provide optical properties of security features made from the UV-Vis curable screen printing security inks (E7-E34) according to the invention and made from the comparative UV-Vis curable screen printing security inks (C11-C19).

Preparation of the Surface Treatment of Flakes (P1-P4) with Different Compounds (b-g)

Method 1a (Fluorolink® P54 for Treating Flakes ChromeFlair® (Viavi Solutions))

Fluorolink® P54 (Solvay, 20 wt-% in water) was dissolved in an equivalent amount of isopropanol (Brenntag-Schweizer, 99%) so as to yield a 10 wt-% solution.

In a 1 liter polypropylene beaker, 50 g of flakes were added to 440 g of isopropanol (Brenntag-Schweizer, 99%) and dispersed at room temperature using a Dispermat (LC220-12) for 10 minutes at 600 rpm. 10 g of said 10 wt-% solution of Fluorolink® P54 were added to the dispersion and further dispersed at room temperature for 15 minutes at 600 rpm. The resulting dispersion was poured on a Büchner funnel equipped with a filter paper under vacuum (water pump) and washed three times with 200 g isopropanol (Brenntag-Schweizer, 99%) and one last time with 200 g acetone (Brenntag-Schweizer, 99%). Finally, the surface-treated high-aspect ratio pigment was dried under vacuum for 5 minutes.

Method 1b (Fluorolink® P54 for Treating Flakes Pyrisma® Yellow T30-20 (Merck) and Lumina® Turquoise 9T30D (BASF))

In a 50 mL polypropylene test tube, 2 g of flakes were added to 17.2 g of isopropanol (Brenntag-Schweizer, 99%) at room temperature. 0.8 g of a 10 wt-% solution of Fluorolink® P54 (procedure described for method 1a) were added and the tube was shaken vigorously for 2 minutes. After sedimentation of the flakes, the top layer of solvent was removed with a syringe and the flakes were subsequently washed two times with 20 g of isopropanol (Brenntag-Schweizer, 99%) and one time with 20 g of acetone

TABLE 1

| | Flakes (supplier) | Surface-treatment agent (supplier) | Amount [wt-%] |
|---|---|---|---|
| P1a | ChromaFlair® blue-to-red[a] | — | — |
| P1b | (Viavi Solutions) | Fluorolink® P54 Perfluoropolyether functionalized with phosphate groups (CAS no. 200013-65-6) (Solvay) | 2 |
| P1c | | Fluorolink® S10 Perfluoropolyether functionalized with silane groups (CAS no. 223557-70-8) (Solvay) | 3.75 |
| P1d | | Dynasilan® F8815 Fluoroalkyl functionalized with siloxane groups (CAS no. not available) (Evonik) | 5 |
| P1e | | PolyFox™ 156A Perfluoropolyether with sulfate groups (CAS no. 452080-67-0) (Omnova Solutions) | 2 |
| P1f | | Lakeland PAE-185 Alkyl phosphate ester with alkyl = $C_{18}H_{35}$ (CAS no. not available) (Lakeland Laboratories Ltd) | 2 |
| P2a | Pyrisma® Yellow[b] T30-20 | — | — |
| P2b | (Merck) | Fluorolink® P54 (Solvay) | 4 |
| P3a | Lumina® Turquoise 9T30D[c] | — | — |
| P3b | (BASF) | Fluorolink® P54 (Solvay) | 4 |
| P4a | Achromic reflective | — | — |
| P4b | pigments[d] (Viavi Solutions) | Fluorolink® P54 (Solvay) | 2 |

[a]Fabry-Perot 5-layers optically variable flakes having a chromium oxide top layer and having a d50 value of 17-21 µm,
[b]mica flakes coated with titanium oxide/tin oxide and having a D50 value of 14-19 µm,
[c]mica flakes coated with titanium oxide having a D50 value of 21 µm,
[d]5-layers flakes coated with magnesium fluoride having a D50 value of 12 µm.

(Brenntag-Schweizer, 99%). The so-obtained surface-treated flakes were dried on a paper filter at room temperature for 30 minutes.

Method 1c (Fluorolink® P54 for Treating Achromic Reflective Pigments (Viavi Solutions))

In a 50 mL polypropylene test tube, 2 g of flakes were added to 17.6 g of isopropanol (Brenntag-Schweizer, 99%) at room temperature. 0.4 g of a 10 wt-% solution of Fluorolink® P54 (procedure described for method 1a) were added and the tube was shaken vigorously for 2 minutes. After sedimentation of the flakes, the top layer of solvent was removed with a syringe and the flakes were subsequently washed two times with 20 g of isopropanol (Brenntag-Schweizer, 99%) and one time with 20 g of acetone (Brenntag-Schweizer, 99%). The so-obtained surface-treated flakes were dried on a paper filter at room temperature for 30 minutes.

Method 2 (Fluorolink® S10 for Treating Flakes Chroma-Flair® (Viavi Solutions))

100 g of a solution comprising Fluorolink® S10 (Solvay) was prepared by mixing at room temperature a mixture of a) 0.5 g of acetic acid (Sigma-Aldrich, 99.8%), 2 g of deionized water and 97 g isopropanol (Brenntag-Schweizer, 99%) and b) 0.5 g of Fluorolink® S10 to said mixture. The so-obtained solution was dispersed using a Dispermat (LC220-12) for 30 minutes at 600 rpm so as to obtain a 0.5 wt-% solution of Fluorolink® S10.

In a 50 mL polypropylene test tube, 2 g of flakes were added to 15 g of the 0.5 wt-% of Fluorolink® S10 solution and the tube was shaken vigorously for 2 minutes. The surface-treated flakes were filtered on a Büchner funnel under vacuum (water pump) and while said flakes were still humid, they were placed in a glassware and dried in an oven at 100° C. for 30 minutes before use.

Method 3 (PolyFox™ 156A for Treating Flakes Chrome-Flair® (Viavi Solutions))

100 g of a solution comprising PolyFox™ 156A was prepared by mixing 22.2 g of PolyFox™ 156A (Omnova Solutions, 30 wt-% in water) and 77.8 g of a 50/50 mixture of water and ispropanol (Brenntag-Schweizer, 99%) so as to obtain a 6.67 wt-% solution of PolyFox™ 156A.

In a 50 mL polypropylene test tube, 2 g of flakes were added to 17.4 g of isopropanol (Brenntag-Schweizer, 99%) at room temperature. 0.6 g of the 6.67 wt-% solution of PolyFox™ 156A were added to the dispersion and the tube was shaken vigorously for 2 minutes. The surface-treated flakes were filtered on a Büchner funnel under vacuum (water pump) and while said flakes were still humid, they were placed in a glassware and dried in an oven at 100° C. for 30 minutes before use.

Method 4 (Lakeland PAE-185 for Treating Flakes Chroma-Flair® (Viavi Solutions))

100 g of a solution comprising Lakeland PAE-185 was prepared by mixing 2.4 g of Lakeland PAE-185 (Lakeland Laboratories Ltd, >90%) and 97.6 g of a 50/50 mixture of water and ispropanol (Brenntag-Schweizer, 99%) so as to obtain a 2.2 wt-% solution of Lakeland PAE-185.

In a 50 mL polypropylene test tube, 2 g of flakes were added to 16.2 g of isopropanol (Brenntag-Schweizer, 99%). 1.8 g of the 2.2 wt-% solution of Lakeland PAE-185 were added to the dispersion and the tube was shaken vigorously for 2 minutes. The surface-treated flakes were filtered on a Büchner funnel under vacuum (water pump) and while said flakes were still humid, they were placed in a glassware and dried in an oven at 100° C. for 30 minutes before use.

Method 5 (Dynasilan® F8815 for Treating Flakes Chroma-Flair® (Viavi Solutions))

100 g of a solution comprising Dynasilan® F8815 was prepared by mixing 2 g of Dynasilan® F8815 (Evonik, >99%) and 98 g of a 50/50 mixture of water and ispropanol (Brenntag-Schweizer, 99%) so as to obtain a 2 wt-% solution of Dynasilan® F8815.

In a 50 mL polypropylene test tube, 2 g of flakes were added to 13 g of isopropanol (Brenntag-Schweizer, 99%). 5 g of the 2 wt-% solution of Dynasilan® F8815 were added to the dispersion and the tube was shaken vigorously for 2 minutes. The surface-treated flakes were filtered on a Büchner funnel under vacuum (water pump) and while said flakes were still humid, they were placed in a glassware and dried in an oven at 100° C. for 30 minutes before use.

Inks (E1-E6 and C1-C9) Preparation and Printed Security Features Obtained Thereof A0. Preparation of Solvent Based Ink Vehicle V0 (Table 2A) and UV-Vis Curable Ink Vehicle V1 (Table 2B)

TABLE 2A

Solvent-based ink vehicle V0

| Ingredient | Commercial name (supplier) | Chemical name (CAS number) | Amount [wt-%] |
|---|---|---|---|
| Solvent | Butylglycol acetate (Brenntag-Schweizer) | 2-Butoxyethyl acetate (112-07-2) | 51.5 |
| Resin | Neocryl B-728 (DSM Neoresins) | Acrylic homopolymer, MW~65000 g/mol (not available) | 20.0 |
| Solvent | Ethyl 3-ethoxypropionate (Brenntag-Schweizer) | Ethyl 3-ethoxypropionate (763-69-9) | 16.9 |
| Solvent | Dowanol DPM (Dow Chemicals) | (2-Methoxymethylethoxy) propanol (34590-94-8) | 7.5 |
| Anti-foaming agent | Byk-1752 (BYK) | Silicone-free defoamer (not available) | 3.7 |
| Filler | Aerosil 200 (Evonik) | Silicon dioxide (7631-86-9) | 0.4 |
| Viscosity | | 1170 mPas | |

Ingredients of the ink vehicle V0 provided in Table 2A were mixed and dispersed at room temperature using a Dispermat (model CV-3) for 15 minutes at 1000-1500 rpm so as to yield 100 g of the ink vehicle V0.

Viscosity values provided in Table 2A were independently measured on about 15 g of the ink vehicle at 25° C. on a Brookfield viscometer (model "DV-1 Prime", spindle S27 at 100 rpm).

TABLE 2B

UV-Vis curable ink vehicle V1

| Ingredient | Commercial name (supplier) | Chemical name (CAS number) | Amount [wt-%] |
|---|---|---|---|
| Oligomer | GENOMER* 4316 (RAHN) | Aliphatic polyester urethane acrylate MW = 5523 ± 613 g/mol eq PS (not available) | 35.1 |

TABLE 2B-continued

UV-Vis curable ink vehicle V1

| Ingredient | Commercial name (supplier) | Chemical name (CAS number) | Amount [wt-%] |
|---|---|---|---|
| Triacrylate monomer | TMPTA (Allnex) | Trimethylolpropane triacrylate (15625-89-5) | 31.5 |
| Photoinitiator | Speedcure TPO-L (LAMBSON) | Ethyl(2,4,6-trimethylbenzoyl)phenylphosphinate (84434-11-7) | 3 |
| Photoinitiator | Omnirad 73 (IGM) | 2-Hydroxy-2-methyl-1-phenyl-propan-1-one (7473-98-5) | 4 |
| Diacrylate monomer | Miramer M216 (RAHN) | Propoxylated neopentyl glycol diacrylate (84170-74-1) | 24.6 |
| Filler | Aerosil ® 200 (EVONIK) | Silicon dioxide (7631-86-9) | 0.6 |
| Antifoaming agent | Tego ® Airex 900 (EVONIK) | Siloxanes and silicones, di-Me, reaction products with silica (67762-90-7) | 1.2 |
| Viscosity | | 890 mPas | |

The weight average molecular weights of the oligomers used therein (GENOMER* 4316 from RAHN and Ebecryl® 2003 from Allnex) were independently determined by GPC (gel permeation chromatography) according to the OECD test method 118. A Malvern Viskotek GPCmax was used. The device was equipped with an isocratic pump, a degasser, an autosampler and a triple detector TDA 302 comprising a differential refractometer, a viscosimeter and a double-angle light scattering detector (7° and 90°). For this specific measurement, only the differential refractometer was used. A calibration curve (log(molecular mass)=f(retention volume)) was established using six polystyrene standards (with molecular masses ranging from 472 to 512000 g/mol). Two columns Viskotek TM4008L (column length 30.0 cm, internal diameter 8.0 mm) were coupled in series. The stationary phase was made of a styrene-divinylbenzene copolymer with a particle size of 6 µm and a maximum pore size of 3000 Å. During the measurement, the temperature was fixed at 35° C. The analyzed samples contained 10 mg/mL of Genomer* 4316 dissolved in THF (Acros, 99.9%, anhydrous) and were injected at a rate of 1 mL/min. The molecular mass of the polymer was calculated from the chromatogram as a polystyrene-equivalent weight average molecular weight (PS eq MW), with a 95% confidence level and the average of three measurements of the same solution, using the following formula:

$$M_w = \frac{\sum_{i=1}^{n} H_i M_i}{\sum_{i=1}^{n} H_i}$$

where $H_i$ is the level of the detector signal from the baseline for the retention volume $V_i$, $M_i$ is the molecular weight of the polymer fraction at the retention volume $V_i$ and n is number of data points. Omnisec 5.12 as provided with the device was used as a software.

Ingredients of the ink vehicle V1 provided in Table 2B were mixed and dispersed at room temperature using a Dispermat (model CV-3) for 15 minutes at 1000-1500 rpm so as to yield 100 g of the ink vehicle.

Viscosity values provided in Table 2B were independently measured on about 15 g of the ink vehicle at 25° C. on a Brookfield viscometer (model "DV-1 Prime", spindle S27 at 100 rpm).

A1. Preparation of Comparative Solvent-Based Screen Printing Security Inks (C1, C3, C5 and C9)

Comparative solvent-based screen printing security inks (C1, C3, C5 and C9) were prepared with the solvent-based ink vehicle V0 described in Table 2A and flakes P1a, P2a, P3a, and P4a respectively (i.e. used as commercially available without any further surface treatment).

17 wt-% of the flakes P1a, P2a, P3a and P4a were independently added to 83 wt-% of the ink vehicle V0 and dispersed at room temperature using a Dispermat (model CV-3) for 5 minutes at 800-1000 rpm so as to independently obtain 20 g of the comparative solvent-based screen printing security inks.

A2. Preparation of Comparative UV-Vis Curable Screen Printing Security Inks (C2, C4, C6, C7, C8 and C10) and UV-Vis Curable Screen Printing Security Inks According to the Invention (E1-E6)

Comparative UV-Vis curable screen printing security inks (C2, C4, C6 and C10) were prepared with an ink vehicle V1 described in Table 2B and flakes P1a, P2a, P3a and P4a, respectively (i.e. used as commercially available without any further surface treatment).

Comparative UV-Vis curable screen printing security inks (C7 and C8) were prepared with an ink vehicle V1 described in Table 2B and flakes P1e and P1f, respectively (i.e. comprising either a surface treatment made of a fluoro containing compound but not being functionalized with one or more phosphor (P) containing groups or one or more silicon (Si) containing groups (P1e), or a surface treatment not made of a fluoro containing compound but functionalized with one or more phosphor (P) containing groups or one or more silicon (Si) containing groups (P1f)).

The UV-Vis curable screen printing security inks (E1-E6) according to the invention were prepared with the UV-Vis curable ink vehicle V1 described in Table 2B and surface treated flakes P1b, P2b, P3b, P1c, P1d and P4b, respectively.

17 wt-% of the flakes were independently added to 83 wt-% of the ink vehicle V1 and dispersed at room temperature using a Dispermat (model CV-3) for 5 minutes at 800-1000 rpm so as to independently obtain 20 g of the Comparative UV-Vis curable screen printing security inks (C2, C4, C6, C7 and C8) described in Table 2C-1 and the UV-Vis curable screen printing security inks according to the invention (E1-E5) described in Table 2C-1 and to obtain 20 g of the Comparative UV-Vis curable screen printing security inks (C10) described in Table 2C-2 and the UV-Vis curable screen printing security ink according to the invention (E6) described in Table 2C-2.

A3. Preparation of Security Features with Inks (E1-E6 and C1-C10)

The comparative solvent-based screen printing security inks (C1, C3, C5 and C9), the comparative UV-Vis curable screen printing security inks (C2, C4, C6, C7, C8 and C10) and the UV-Vis curable screen printing security inks (E1-E6) according to the invention were independently applied by hand on a piece of fiduciary paper (BNP paper from Louisenthal, 100 g/m$^2$, 14.5 cm×17.5 cm) using a 90 thread/cm screen (230 mesh). The printed pattern had a size of 6 cm×10 cm.

After the printing step, the security features made of the solvent-based screen printing security inks were independently dried with a hot air drier at a temperature of about 50° C. for about one minute.

After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm$^2$+ mercury lamp 200 W/cm$^2$).

A4-a. Optical Properties of Security Features Made from the Inks E1-E5 and C1-C8 (Table 2C-1)

The optical properties of the security features described above were determined both visually and using a goniometer (Goniospektrometer Codec WI-10 5&5 by Phyma GmbH Austria) and are provided in Table 2C-1.

The relative visual assessment was carried out with the following criteria:

Chroma (corresponding to a measure of the color intensity or color saturation) was observed at an angle of 0° to the normal under diffuse illumination (such as the light coming through a window with no direct sunlight), the sample to observe being held vertically against the diffuse light source.

Security features made of the comparative UV-Vis curable screen printing security inks (C2, C4 and C6) and the UV-Vis curable screen printing security inks (E1, E2 and E3) according to the invention were compared with security feature made of the comparative solvent-based inks (C1, C3, and C5), respectively. Security features made of the comparative UV-Vis curable screen printing security inks (C7 and C8) and the UV-Vis curable screen printing security ink (E4 and E5) according to the invention were compared with security feature made of the comparative solvent-based inks (C1).

The following scale was used: "++" (a higher chroma was immediately obvious), "+" (a higher chroma was observable under closer examination), "0" (similar chroma), "−" (a lower chroma was observable under closer examination), and "−−" (a lower chroma was immediately obvious).

Color travel (corresponding to the change of color or hue as a function of the viewing angle) was observed by first looking at the sample at an angle of about 0° to the normal, the sample to observe being held vertically against the diffuse light source. The angle of view was then progressively changed to about 80° to the normal (by rotating the sample vertically or horizontally) while observing the change of color.

Security features made of the comparative UV-Vis curable screen printing security inks (C2, C4 and C6) and the UV-Vis curable screen printing security inks (E1, E2 and E3) according to the invention were compared with security feature made of the comparative solvent-based inks (C1, C3, and C5), respectively. Security features made of the comparative UV-Vis curable screen printing security inks (C7 and C8) and the UV-Vis curable screen printing security inks (E4 and E5) according to the invention were compared with security feature made of the comparative solvent-based inks (C1).

The following scale was used: "++" (a wider color travel was easily observable), "+" (a wider color travel was observable under closer examination), "0" (similar color travel), "−" (a narrower color travel was observable under closer examination), and "−−" (a narrower color travel was easily observable)

The assessment with the goniometer described hereabove was carried out as follows: the L*a*b* values of the printed security features were determined at two angles, respectively 22.5° to the normal with illumination at 22.5° (denoted below as 22.5°/22.5° in Table 2C-1) and 45° to the normal with illumination at 45° (denoted below as 45°/45° in Table 2C-1). The C* (chrome) values were calculated from a* and b* values according to the CIELAB (1976) color space, wherein:

$$C^* = \sqrt{(a^*)^2 + (b^*)^2}$$

A4-b. Optical Properties of Security Features Made from the Ink E6 and C9-C10 (Table 2C-2)

The optical properties of the security features described above were determined both visually and using the same goniometer described under A5-a and are provided in Table 2C-2.

The relative visual assessment was carried out with the following criterion:

Lightness (corresponding to a measure of the white/black aspect) was observed at an angle of 0° to the normal under diffuse illumination (such as the light coming through a window with no direct sunlight), the sample to observe being held vertically against the diffuse light source.

Security features made of the comparative UV-Vis curable screen printing security ink (C10) and the UV-Vis curable screen printing security ink (E6) according to the invention were compared with security feature made of the comparative solvent-based ink (C9).

The following scale was used: "++" (a higher lightness was immediately obvious), "+" (a higher lightness was observable under closer examination), "0" (similar lightness), "−" (a lower lightness was observable under closer examination), and "−−" (a lower lightness was immediately obvious).

The lightness values with the goniometer described hereabove was directly obtained from the measurement at two angles, respectively 22.5° to the normal with illumination at 22.5° (denoted below as 22.5°/22.5° in Table 2C-2) and 45° to the normal with illumination at 45° (denoted below as 45°/45° in Table 2C-2).

TABLE 2C-1

Optical properties of the security features made from the inks E1-E5 and C1-C8

| Sample No | Pigments | Ink vehicle | Visual assessment Chroma | Color travel | Goniometer (Phyma) C* 22.5/22.5 | C° 45/45 |
|---|---|---|---|---|---|---|
| C1 | P1a (ChromaFlair ®) | V0 (solvent-based) | Reference | | 40 | 33 |
| C2 | P1a (ChromaFlair ®) | V1 (UV-Vis curable) | − − | − | 10 | 11 |
| E1 | P1b (ChromaFlair ®) | V1 (UV-Vis curable) | ++ | 0 | 65 | 51 |
| C3 | P2a (Pyrisma ®) | V0 (solvent-based) | Reference | | 28 | 31 |
| C4 | P2a (Pyrisma ®) | V1 (UV-Vis curable) | − − | − − | 19 | 20 |
| E2 | P2b (Pyrisma ®) | V1 (UV-Vis curable) | ++ | + | 57 | 60 |
| C5 | P3a (Lumina ®) | V0 (solvent-based) | Reference | | 19 | 19 |
| C6 | P3a (Lumina ®) | V1 (UV-Vis curable) | − | − | 13 | 10 |
| E3 | P3b (Lumina ®) | V1 (UV-Vis curable) | + | 0 | 27 | 25 |
| C1 | P1a (ChromaFlair ®) | V0 (solvent-based) | Reference | | 40 | 33 |
| C7 | P1e (ChromaFlair ®) | V1 (UV-Vis curable) | − | − | 12 | 12 |
| C8 | P1f (ChromaFlair ®) | V1 (UV-Vis curable) | − | 0 | 34 | 23 |
| E1 | P1b (ChromaFlair ®) | V1 (UV-Vis curable) | ++ | 0 | 65 | 51 |
| E4 | P1c (ChromaFlair ®) | V1 (UV-Vis curable) | + | 0 | 55 | 42 |
| E5 | P1d (ChromaFlair ®) | V1 (UV-Vis curable) | + | 0 | 57 | 43 |

TABLE 2C-2

Optical properties of the security features made from the inks E6 and C9-C10

| Sample No | Pigments | Ink vehicle | Visual assessment Lightness | Goniometer (Phyma) L[a) 22.5/22.5 | L° 45/45 |
|---|---|---|---|---|---|
| C9 | P4a Achromic reflective pigments | V0 (solvent-based) | Reference | 131 | 142 |
| C10 | P4a Achromic reflective pigments | V1 (UV-Vis curable) | − − | 120 | 132 |
| E6 | P4b Achromic reflective pigments | V1 (UV-Vis curable) | + | 150 | 164 |

[a)]Lightness values according to CIELAB (1978) are in the range from 0 (full black) to 100 (full white).
Lightness higher than 100 indicates specular reflection, which is usual with reflective pigments.

As shown in Tables 2C, the security features made from the inks E1, E2, E3 and E6 according to the invention exhibited strongly improved optical performance (visual assessment and goniometer assessment) in comparison with the security features made from the comparative UV-Vis curable screen printing security inks C2, C4, C6 and C10 (same ink vehicle, flakes used as commercially available) and with the security features made from the comparative solvent-based printing security inks C1, C3, C5, and C9 (ink vehicle according to the prior art, flakes used as commercially available).

The security features made from the inks E4-E5 according to the invention exhibited improved optical performance (visual assessment and goniometer assessment) in comparison with the security features made from the comparative solvent-based screen printing security inks (C1) and from the UV-Vis curable screen printing security inks C7 and C8 (same ink vehicle, different surface treatment).

In particular, the security features made from the comparative UV-Vis curable screen printing security ink comprising a surface treatment layer made of a fluoro containing compound but not being functionalized with one or more phosphor (P) containing groups or one or more silicon (Si) containing groups (in particular missing phosphate, silane and/or siloxane groups) (C7, fluoro containing compounds with sulfate groups) exhibited not only poor optical properties (visual assessment and goniometer assessment) but also worse properties than the security feature made of the comparative solvent-based screen printing security ink (C1).

The security features made from the comparative UV-Vis curable screen printing security ink comprising a surface treatment layer not made of a fluoro containing compounds and being functionalized with one or more phosphor (P) containing groups or one or more silicon (Si) containing groups (in particular phosphate, silane and/or siloxane groups) (C8, alkyl phosphate ester with alkyl exhibited not only poor optical properties (visual assessment and goniometer assessment) but also worse properties than the security feature made of the comparative solvent-based screen printing security ink (C1).

Ink (E7 and C11-C14) Preparation and Printed Security Features Obtained Thereof—Diacrylate Monomers B0. Preparation of UV-Vis Curable Ink Vehicle V1-V5 (Table 3A)

TABLE 3A

UV-Vis curable ink vehicle V1-V5

| Ingredient | Commercial name (supplier) | Chemical name (CAS number) | V1 | V2 | V3 wt-% | V4 | V5 |
|---|---|---|---|---|---|---|---|
| Oligomer | GENOMER* 4316 (RAHN) | Aliphatic polyester urethane acrylate (not available) | 35.1 | 35.1 | 35.1 | 35.1 | 35.1 |
| Triacrylate monomer | TMPTA (Allflex) | Trimethylolpropane triacrylate (15625-89-5) | 31.5 | | | | |
| Photoinitiator | Speedcure TPO-L (LAMBSON) | Ethyl(2,4,6-trimethylbenzoyl)phenyl phosphinate (84434-11-7) | | | | 3 | |
| Photoinitiator | Omnirad 73 (IGM) | 2-Hydroxy-2-methyl-1-phenyl-propan-1-one (7473-98-5) | | | | 4 | |
| Filler | Aerosil ® 200 (EVONIK) | Silicon dioxide (7631-86-9) | | | | 0.6 | |
| Anti-foaming agent | Tego ® Airex 900 (EVONIK) | Siloxanes and silicones, di-Me, reaction products with silica (67762-90-7) | | | | 1.2 | |
| Diacrylate monomer | Miramer M216 (RAHN) | Propoxylated neopentyl glycol diacrylate (84170-74-1) | 24.6 | 24.6 | | | |
| Diacrylate monomer | HDDA (Allflex) | 1,6-Hexanediol diacrylate (13048-33-4) | | 31.5 | 24.6 | | |
| Diacrylate monomer | DPGDA (Allflex) | Dipropylene glycol diacrylate (57472-68-1) | | | 31.5 | 31.5 | 31.5 |
| Diacrylate monomer | Sartomer 259 (Arkema) | Polyethylene glycol(200) diacrylate (26570-48-9) | | | | 24.6 | |
| Diacrylate monomer | TPGDA DEO (Allflex) | Tripropylene glycol diacrylate (42978-66-5) | | | | | 24.6 |
| | | Viscosity [mPas] | 750 | 210 | 230 | 290 | 290 |

Ingredients of the respective ink vehicles V1-V5 provided in Table 4AB were mixed and dispersed at room temperature using a Dispermat (model CV-3) for 15 minutes at 1000-1500 rpm so as to yield 100 g of the ink vehicle.

Viscosity values provided in Table 3A were independently measured on about 15 g of the ink vehicle at 25° C. on a Brookfield viscometer (model "DV-I Prime", spindle S27 at 100 rpm for V1 and spindle S21 at 100 rpm for V2-V5).

B1. Preparation of UV-Vis Curable Screen Printing Security Inks (E7 and C11-C14)

The UV-Vis curable screen printing security inks (E7) according to the invention and comparative UV-Vis curable screen printing security inks (C11-C14) were prepared with the respective ink vehicle V1-V5 described in Table 3A and flakes P1b. The security ink E7 was identical to the inks E1 of Table 2C and was prepared at the same time as the comparative inks (C11-C14).

17 wt-% of the flakes P1b were independently added to 83 wt-% of the respective ink vehicle V1-V5 and dispersed at room temperature using a Dispermat (model CV-3) for 5 minutes at 800-1000 rpm so as to independently obtain 20 g of the UV-Vis curable screen printing security inks (E7) according to the invention and the comparative UV-Vis curable screen printing security inks (C11-C14) described in Table 3B.

B2. Preparation and Optical Properties of Security Features Made from the Inks E7 and C11-C14 (Table 3B)

The comparative UV-Vis curable screen printing security inks (C11-C14) and the UV-Vis curable screen printing security ink (E7) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the same goniometer described under A4-a and are provided in Table 3B.

The relative visual assessment was carried out with the following criteria:

Chroma (corresponding to a measure of the color intensity or color saturation) was observed at an angle of 0° to the normal under diffuse illumination (such as the light coming through a window with no direct sunlight), the sample to observe being held vertically against the diffuse light source.

The following scale was used: excellent, good, sufficient, poor. Poor chroma refers to samples that are not suitable to be used as security features for highly demanding end-use applications.

Color travel (corresponding to the change of color or hue as a function of the viewing angle) was observed by first looking at the sample at an angle of about 0° to the normal, the sample to observe being held vertically against the diffuse light source. The angle of view was then progressively changed to about 80° to the normal (by rotating the sample vertically or horizontally) while observing the change of color. The following scale was used: excellent, good, sufficient, poor. Poor color travel means that the color difference upon changing the viewing angle is not easily perceived or not perceived at all by the naked eye, thus making the security feature not suitable for highly demanding end-use applications.

Ink coverage: Insufficient ink coverage leads to more or less extended white speckles that disturb the visual appearance. The following scale was used: excellent, good, sufficient, poor. "Excellent" means that there is no white speckles when the printed security feature is observed from a distance of about 50 cm. "Good" means that there are some white speckles, but that the visual appearance is only very slightly affected. "Sufficient" means that there are a higher number of white speckles, but that the printed security feature is still usable. "Poor" means that the extent of white speckles is so high that the security feature is unusable.

B3. Results Preparation of Security Features Made from the Inks E7 and C11-C14

TABLE 3B

Optical properties of the security features made from the inks E6 and C11-C14

| Sample No | Pigments | Ink vehicle | Visual assessment | | | Goniometer (Phyma) | |
| --- | --- | --- | --- | --- | --- | --- | --- |
| | | | Chroma | Color travel | Ink coverage | C* 22.5/22.5 | C° 45/45 |
| E7 | P1b (ChromaFlair ®) | V1 | Good | Excellent | Good | 72 | 57 |
| C11 | P1b (ChromaFlair ®) | V2 | Poor | Sufficient | Sufficient | 66 | 51 |
| C12 | P1b (ChromaFlair ®) | V3 | Poor | Sufficient | Poor | 60 | 46 |
| C13 | P1b (ChromaFlair ®) | V4 | Poor | Sufficient | Poor | 63 | 49 |
| C14 | P1b (ChromaFlair ®) | V5 | Poor | Sufficient | Poor | 61 | 48 |

As shown in Table 3B, the security features made of the comparative inks C11-C14 exhibited a poorer visual appearance and lower values of chroma as measured by the goniometer. Ink coverage was particularly bad, thus resulting in extended white speckles that negatively impacted the overall appearance of the printed security features. As shown in Table 3B, UV-Vis curable screen printing security inks comprising one or more oligomers but lacking one or more triacrylate monomers and/or tetraacrylate monomers suffer from poor optical properties, in particular a poor chroma and a poor ink coverage, due to the lack of one or more triacrylate monomers and/or tetraacrylate monomers.

Inks (E8-E10 and C13-C17) Preparation and Printed Security Features Obtained Thereof—Influence of the Oligomers C0. Preparation of UV-Vis Curable Ink Vehicle V1-V5 (Table 4A)

TABLE 4A

UV-Vis curable ink vehicle V1 and V6-V12

| Ingredient | Commercial name (supplier) | Chemical name (CAS number) | V1 | V6 | V7 | V8 | V9 | V10 | V11 | V12[a] |
|---|---|---|---|---|---|---|---|---|---|---|
| | | | | | | Amount [wt-%] | | | | |
| Oligomer | GENOMER* 4316 (RAHN) | Aliphatic polyester urethane acrylate (not available) | 35.1 | 10 | 20 | 25 | 50 | 60 | 70 | |
| Oligomer | Ebecryl® 3720-TM40 (Allnex) | 60% Bisphenol-A epoxy diacrylate diluted in 40% TMPTA (60% 55818-57-0 in 40% 15625-89-5) | | | | | | | | 10.4 |
| Triacrylate monomer | TMPTA (Allnex) | Trimethylolpropane triacrylate (15625-89-5) | 31.5 | 45.6 | 40 | 37.2 | 23.1 | 17.6 | 11.9 | 27.2 |
| Tetraacrylate monomer | DiTMPTA (RAHN) | Ditrimethylolpropane tetraacrylate (94108-97-1) | | | | | | | | 14.3 |
| Photoinitiator | Speedcure TPO-L (LAMBSON) | Ethyl(2,4,6-trimethylbenzoyl)-phenyl phosphinate (84434-11-7) | | | | | 3 | | | |
| Photoinitiator | Omnirad 73 (IGM) | 2-Hydroxy-2-methyl-1-phenyl-propan-1-one (7473-98-5) | | | | | 4 | | | |
| Filler | Aerosil® 200 (EVONIK) | Silicon dioxide (7631-86-9) | | | | | 0.6 | | | |
| Antifoaming agent | Tego® Airex 900 (EVONIK) | Siloxanes and silicones, di-Me, reaction products with silica (67762-90-7) | | | | | 1.2 | | | |
| Diacrylate monomer | Miramer M216 (RAHN) | Propoxylated neopentyl glycol diacrylate (84170-74-1) | 24.6 | 35.6 | 31.2 | 29.0 | 18.1 | 13.6 | 9.3 | 39.3 |
| | | Viscosity [mPas] | 890 | 60 | 120 | 320 | 1290 | 4700 | 6860 | 130 |

[a]Ink vehicle comprising the oligomer/monomers corresponding to those used in Table 5 of WO 2013/119387 A1.

Ingredients of the respective ink vehicles V1 and V6-V12 provided in Table 4A were mixed and dispersed at room temperature using a Dispermat (model CV-3) for 15 minutes at 1000-1500 rpm so as to yield 100 g of the respective ink vehicle.

Viscosity values provided in Table 4A were independently measured on about 15 g of the ink vehicle at 25° C. on a Brookfield viscometer (model "DV-1 Prime", spindle S27 at 100 rpm for V1 and V9, spindle S21 at 100 rpm for V6, V7, V8 and V12, and spindle S27 at 50 rpm for V10 and V11).

C1. Preparation of Comparative UV-Vis Curable Screen Printing Security Inks (E8-E10 and C15-C19)

The UV-Vis curable screen printing security inks (E8-E10) according to the invention and comparative UV-Vis curable screen printing security inks (C15-C19) were prepared with the respective ink vehicle V1 and V6-V12 described in Table 4A and flakes P1b. The security ink E9 was identical to the ink E1 of Table 2C and was prepared at the same time as the inks E9-10 and C15-C19.

As shown in Table 4A, the flakes, the photoinitiators and the antifoaming agent were the same and were in the same amount for E8-E10 and C15-C19.

17 wt-% of the flakes P1b were independently added to 83 wt-% of the respective ink vehicle V1 and V6-V12 and dispersed at room temperature using a Dispermat (model CV-3) for 5 minutes at 800-1000 rpm so as to independently obtain 20 g of the UV-Vis curable screen printing security inks (E8-E10) according to the invention and the comparative UV-Vis curable screen printing security inks (C15-C19) described in Table 4B.

The comparative UV-Vis curable screen printing security ink C19 comprised a same ink vehicle as the one disclosed in example 3 of WO 2013/119387 A1. As described in WO 2013/119387 A1, 2 wt-% (based on the total UV-Vis curable screen printing security ink) ethyl 4-(dimethylamino)benzoate (EDB, CAS 10287-53-3, cure accelerator) were added to said ink prior to printing. The final ink contains 16.7 wt-% pigment, 81.3 wt-% ink vehicle and 2 wt-% synergist.

C2. Preparation and Optical Properties of Security Features Made from the Inks E8-E10 and C15-019 (Table 4B)

The comparative UV-Vis curable screen printing security inks (C15-C19) and the UV-Vis curable screen printing security ink (E8-E10) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer described under A4-a and are provided in Table 4B. The relative visual assessment was carried out with the same criteria as described under item B2 described hereabove.

C3. Results Preparation of Security Features Made from the Inks E8-E10 and C15-C19

Whereas the comparative UV-Vis curable screen printing security inks C17 and C18 exhibited good/excellent optical properties, said comparative inks C17 and C18 comprising an ink vehicle having a viscosity outside the claimed range (4700 and 6860 mPas, respectively), said viscosity making

TABLE 4B

Optical properties of the security features made from the inks E8-E10 and C15-C19

| Sample No | Pigments | Ink vehicle | Visual assessment | | | Goniometer (Phyma) | |
|---|---|---|---|---|---|---|---|
| | | | Chroma | Color travel | Ink coverage | $C^*$ 22.5/22.5 | $C°$ 45/45 |
| C15 | P1b (ChromaFlair ®) | V6 | Poor | Poor | Poor | 49 | 39 |
| C16 | P1b (ChromaFlair ®) | V7 | Sufficient | Poor | Poor | 62 | 49 |
| E8 | P1b (ChromaFlair ®) | V8 | Sufficient | Good | Sufficient | 67 | 53 |
| E9 | P1b (ChromaFlair ®) | V1 | Good | Excellent | Good | 68 | 53 |
| E10 | P1b (ChromaFlair ®) | V9 | Good | Excellent | Good | 69 | 54 |
| C17 | P1b (ChromaFlair ®) | V10 | Excellent | Excellent | Excellent | 66 | 52 |
| C18 | P1b (ChromaFlair ®) | V11 | Excellent | Excellent | Excellent | 63 | 49 |
| C19 | P1b (ChromaFlair ®) | V12 | Poor | Poor | Poor | 52 | 40 |

As shown in Table 4B, the security features made of the UV-Vis curable screen printing security inks E8-E10 comprising an ink vehicle having a viscosity within the claimed range and comprising one or more oligomers within the claimed range exhibited an improved visual appearance and improved values of chroma as measured by the goniometer (visual assessment and goniometer assessment) in comparison with the security features made from comparative inks.

The comparative UV-Vis curable screen printing security inks C15 and C16 comprising an ink vehicle having a viscosity outside the claimed range (55 and 118 mPas, respectively) suffered from a too low viscosity to ensure a correct print quality on an industrial screen printing press. Moreover, said comparative inks C15 and C16 suffered from poor optical properties.

them unable to ensure a correct print quality on an industrial screen printing press.

The comparative UV-Vis curable screen printing security inks C19 comprising an ink vehicle having a viscosity outside the claimed range (129 mPas) suffered from a too low viscosity values to ensure a correct print quality on an industrial screen printing press. Moreover, said comparative ink C19 exhibited poor optical properties.

Inks (E11-E15) Preparation and Printed Security Features Obtained Thereof—Influence of the Oligomers D0. Preparation of UV-Vis Curable Ink Vehicle V1 and V13-V15 (Table 5A)

TABLE 5A

UV-Vis curable ink vehicle V1 and V13-V15

| Ingredient | Commercial name (supplier) | Chemical name (CAS number) | V1 | V13 | V14 | V15 |
|---|---|---|---|---|---|---|
| | | | Amount [wt-%] | | | |
| Oligomer | GENOMER* 4316 (RAHN) | Aliphatic polyester urethane acrylate MW = 5523 ± 613 g/mol eq PS (not available) | 35.1 | | 35.1 | |
| Oligomer | Ebecryl ® 2003 (Allnex) | Difunctional aliphatic urethane acrylate MW = 3581 ± 207 g/mol eq PS (not available) | | 35.1 | | 35.1 |
| Triacrylate monomer | TMPTA (Allnex) | Trimethylolpropane triacrylate (15625-89-5) | 31.5 | 31.5 | | |
| Triacrylate monomer | Ebecryl ® 160 (Allnex) | Ethoxylated (EO3) trimethylolpropane triacrylate (28961-43-5) | | | 31.5 | 31.5 |
| Photoinitiator | Speedcure TPO-L (LAMBSON) | Ethyl(2,4,6-trimethylbenzoyl)-phenyl phosphinate (84434-11-7) | | | 3 | |
| Photoinitiator | Omnirad 73 (IGM) | 2-Hydroxy-2-methyl-1-phenyl-propan-1-one (7473-98-5) | | | | 4 |
| Filler | Aerosil ® 200 (EVONIK) | Silicon dioxide (7631-86-9) | | | 0.6 | |

TABLE 5A-continued

UV-Vis curable ink vehicle V1 and V13-V15

| Ingredient | Commercial name (supplier) | Chemical name (CAS number) | V1 | V13 | V14 | V15 |
|---|---|---|---|---|---|---|
| | | | Amount [wt-%] | | | |
| Antifoaming agent | Tego ® Airex 900 (EVONIK) | Siloxanes and silicones, di-Me, reaction products with silica (67762-90-7) | | 1.2 | | |
| Diacrylate monomer | Miramer M216 (RAHN) | Propoxylated neopentyl glycol diacrylate (84170-74-1) | 24.6 | 24.6 | | |
| Diacrylate monomer | TPGDA DEO (Allnex) | Tripropylene glycol diacrylate (42978-66-5) | | | 24.6 | 24.6 |
| | | Viscosity [mPas] | 890 | 670 | 580 | 580 |

Ingredients of the respective ink vehicles V1 and V13-V15 provided in Table 5A were mixed and dispersed at room temperature using a Dispermat (model CV-3) for 15 minutes at 1000-1500 rpm so as to yield 100 g of the respective ink vehicle.

Viscosity values provided in Table 5A were independently measured on about 15 g of the ink vehicle at 25° C. on a Brookfield viscometer (model "DV-1 Prime", spindle S27 at 100 rpm).

D1. Preparation of UV-Vis Curable Screen Printing Security Inks (E11-E15)

The UV-Vis curable screen printing security inks (E11-E15) according to the invention were prepared with the respective ink vehicle V1 and V13-V15 described in Table 5A and flakes P1b. The security ink E11 was identical to the ink E1 of Table 2C and was prepared at the same time as the inks E12-E15.

17 wt-% of the flakes P1b were independently added to 83 wt-% of the respective ink vehicle V1 and V13-V15 and dispersed at room temperature using a Dispermat (model CV-3) for 5 minutes at 800-1000 rpm so as to independently obtain 20 g of the UV-Vis curable screen printing security inks (E11-E15) according to the invention described in Table 5B.

D2. Preparation and Optical Properties of Security Features Made from the Inks E11-E15 (Table 5B)

The UV-Vis curable screen printing security ink (E11-E15) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer described under A4-a and are provided in Table 5B. The relative visual assessment was carried out with the same criteria as described under item B2 described hereabove.

D3. Results Preparation of Security Features Made from the Inks E11-E15

TABLE 5B

Optical properties of the security features made from the inks E11-E15

| | | | Visual assessment | | | Goniometer (Phyma) | |
|---|---|---|---|---|---|---|---|
| Sample No | Pigments | Ink vehicle | Chroma | Color travel | Ink coverage | C* 22.5/22.5 | C° 45/45 |
| E11 | P1b (ChromaFlair ®) | V1 | Good | Excellent | Good | 64 | 51 |
| E12 | P1b (ChromaFlair ®) | V13 | Sufficient | Excellent | Sufficient | 64 | 50 |
| E14 | P1b (ChromaFlair ®) | V14 | Sufficient | Excellent | Sufficient | 63 | 50 |
| E15 | P1b (ChromaFlair ®) | V15 | Sufficient | Excellent | Sufficient | 66 | 53 |

As shown in Table 5B, the security features made of the UV-Vis curable screen printing security inks E11-E15 comprising an ink vehicle having a viscosity within the claimed range, comprising one or more oligomers within the claimed range and comprising one or more triacrylate monomers within the claimed range of 10-50 wt-% exhibited a sufficient to excellent visual appearance and high values of chroma as measured by the goniometer (visual assessment and goniometer assessment).

Inks (E16-E19) Preparation and Printed Security Features Obtained Thereof—Influence of the Triacrylate Monomers
E0. Preparation of UV-Vis Curable Ink Vehicle V1 and V16-V18 (Table 6A)

CV-3) for 5 minutes at 800-1000 rpm so as to independently obtain 20 g of the UV-Vis curable screen printing security inks (E16-E19) according to the invention described in Table 6B.

TABLE 6A

UV-Vis curable ink vehicle V1 and V16-V18

| Ingredient | Commercial name (supplier) | Chemical name (CAS number) | V1 | V16 | V17 | V18 |
|---|---|---|---|---|---|---|
| | | | Amount [wt-%] | | | |
| Oligomer | GENOMER* 4316 (RAHN) | Aliphatic polyester urethane acrylate (not available) | 35.1 | 35.1 | 35.1 | 35.1 |
| Triacrylate monomer | TMPTA (Allflex) | Trimethylolpropane triacrylate (15625-89-5) | 31.5 | 44.9 | 19.6 | 11.2 |
| Photoinitiator | Speedcure TPO-L (LAMBSON) | Ethyl(2,4,6-trimethylbenzoyl)-phenyl phosphinate (84434-11-7) | | 3 | | |
| Photoinitiator | Omnirad 73 (IGM) | 2-Hydroxy-2-methyl-1-phenyl-propan-1-one (7473-98-5) | | | 4 | |
| Filler | Aerosil ® 200 (EVONIK) | Silicon dioxide (7631-86-9) | | | 0.6 | |
| Antifoaming agent | Tego ® Airex 900 (EVONIK) | Siloxanes and silicones, di-Me, reaction products with silica (67762-90-7) | | | 1.2 | |
| Diacrylate monomer | Miramer M216 (RAHN) | Propoxylated neopentyl glycol diacrylate (84170-74-1) | 24.6 | 11.2 | 36.5 | 44.9 |
| | Viscosity [mPas] | | 890 | 960 | 560 | 450 |

Ingredients of the respective ink vehicles V1 and V16-V18 provided in Table 6A were mixed and dispersed at room temperature using a Dispermat (model CV-3) for 15 minutes at 1000-1500 rpm so as to yield 100 g of the respective ink vehicle.

Viscosity values provided in Table 6A were independently measured on about 15 g of the ink vehicle at 25° C. on a Brookfield viscometer (model "DV-I Prime", spindle S27 at 100 rpm for V1, V16 and V17, and spindle S21 at 100 rpm for V18).

E1. Preparation of UV-Vis Curable Screen Printing Security Inks (E16-E19)

The UV-Vis curable screen printing security inks (E16-E19) according to the invention were prepared with the respective ink vehicle V1 and V16-V18 described in Table 6A and flakes P1b. The security ink E16 was identical to the ink E1 of Table 2C and was prepared at the same time as the inks E17-E19.

17 wt-% of the flakes P1b were independently added to 83 wt-% of the respective ink vehicle V1 and V16-V18 and dispersed at room temperature using a Dispermat (model E2. Preparation and Optical Properties of Security Features Made from the Inks E16-E19 (Table 6B)

The UV-Vis curable screen printing security ink (E16-E19) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer described under A4-a and are provided in Table 6B. The relative visual assessment was carried out with the same criteria as described under item B2 described hereabove.

E3. Results Preparation of Security Features Made from the Inks E16-E19

TABLE 6B

Optical properties of the security features made from the inks E16-E19

| Sample No | Pigments | Ink vehicle | Visual assessment | | | Goniometer (Phyma) | |
|---|---|---|---|---|---|---|---|
| | | | Chroma | Color travel | Ink coverage | C* 22.5/22.5 | C° 45/45 |
| E16 | P1b (ChromaFlair ®) | V1 | Excellent | Excellent | Good | 73 | 58 |
| E17 | P1b (ChromaFlair ®) | V16 | Good | Excellent | Good | 73 | 59 |
| E18 | P1b (ChromaFlair ®) | V17 | Good | Excellent | Good | 71 | 57 |

TABLE 6B-continued

Optical properties of the security features made from the inks E16-E19

| Sample No | Pigments | Ink vehicle | Visual assessment | | | Goniometer (Phyma) | |
|---|---|---|---|---|---|---|---|
| | | | Chroma | Color travel | Ink coverage | C* 22.5/22.5 | C° 45/45 |
| E19 | P1b (ChromaFlair ®) | V18 | Sufficient | Good | Sufficient | 69 | 57 |

As shown in Table 6B, the security features made of the UV-Vis curable screen printing security inks E16-E19 comprising an ink vehicle having a viscosity within the claimed range, comprising one or more oligomers within the claimed range and comprising one or more triacrylate monomers within the claimed range exhibited an excellent visual appearance and high values of chroma as measured by the goniometer (visual assessment and goniometer assessment).

Inks (E20-E25) Preparation and Printed Security Features Obtained Thereof—Influence of the Triacrylate Monomers F0. Preparation of UV-Vis Curable Ink Vehicle V1 and V19-V23 (Table 7A)

TABLE 7A

UV-Vis curable ink vehicle V1 and V19-V23

| Ingredient | Commercial name (supplier) | Chemical name (CAS number) | V1 | V19 | V20 | V21 | V22 | V23 |
|---|---|---|---|---|---|---|---|---|
| | | | Amount [wt-%] | | | | | |
| Oligomer | GENOMER* 4316 (RAHN) | Aliphatic polyester urethane acrylate (not available) | 35.1 | 35.1 | 35.1 | 35.1 | 35.1 | 35.1 |
| Triacrylate monomer | TMPTA (Allnex) | Trimethylolpropane triacrylate (15625-89-5) | 31.5 | | | | | |
| Triacrylate monomer | Ebecryl ® 160 (Allnex) | Ethoxylated (EO3) trimethylolpropane triacrylate (28961-43-5) | | 31.5 | | | | |
| Triacrylate monomer | Miramer M3160 (RAHN) | Ethoxylated (EO6) trimethylolpropane triacrylate (28961-43-5) | | | 31.5 | | | |
| Triacrylate monomer | TMP(EO)9TA (Arkema) | Ethoxylated (EO9) trimethylolpropane triacrylate (28961-43-5) | | | | 31.5 | 31.5 | |
| Triacrylate monomer | EBECRYL ® 53 (Allnex) | Propoxylated glycerol triacrylate (52408-84-1) | | | | | | 31.5 |
| Photoinitiator | Speedcure TPO-L (LAMBSON) | Ethyl(2,4,6-trimethylbenzoyl)-phenyl phosphinate (84434-11-7) | | | | 3 | | |
| Photoinitiator | Omnirad 73 (IGM) | 2-Hydroxy-2-methyl-1-phenyl-propan-1-one (7473-98-5) | | | | | 4 | |
| Filler | Aerosil ® 200 (EVONIK) | Silicon dioxide (7631-86-9) | | | | 0.6 | | |
| Antifoaming agent | Tego ® Airex 900 (EVONIK) | Siloxanes and Silicones, di-Me, reaction products with silica (67762-90-7) | | | | 1.2 | | |
| Diacrylate monomer | Miramer M216 (RAHN) | Propoxylated neopentyl glycol diacrylate (84170-74-1) | 24.6 | 24.6 | 24.6 | 24.6 | | |
| Diacrylate monomer | TPGDA DEO (Allnex) | Tripropylene glycol diacrylate (42978-66-5) | | | | | | 24.6 |
| Diacrylate monomer | Sartomer 259 (Arkema) | Polyethylene glycol(200) diacrylate (26570-48-9) | | | | | 24.6 | |
| | | Viscosity [mPas] | 890 | 700 | 690 | 730 | 640 | 620 |

Ingredients of the respective ink vehicles V1 and V19-V23 provided in Table 7A were mixed and dispersed at room temperature using a Dispermat (model CV-3) for 15 minutes at 1000-1500 rpm so as to yield 100 g of the respective ink vehicle.

Viscosity values provided in Table 7A were independently measured on about 15 g of the ink vehicle at 25° C. on a Brookfield viscometer (model "DV-I Prime", spindle S27 at 100 rpm).

F1. Preparation of UV-Vis Curable Screen Printing Security Inks (E20-E25)

The UV-Vis curable screen printing security inks (E20-E25) according to the invention were prepared with the respective ink vehicle V1 and V19-V23 described in Table 7A and flakes P1b. The security ink E20 was identical to the ink E1 of Table 2C and was prepared at the same time as the inks E21-E25.

17 wt-% of the flakes P1b were independently added to 83 wt-% of the respective ink vehicle V1 and V19-V23 and dispersed at room temperature using a Dispermat (model CV-3) for 5 minutes at 800-1000 rpm so as to independently obtain 20 g of the UV-Vis curable screen printing security inks (E20-E25) according to the invention described in Table 7B.

F2. Preparation and Optical Properties of Security Features Made from the Inks E20-E25 (Table 7B)

The UV-Vis curable screen printing security ink (E20-E25) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer described under A4-a and are provided in Table 7B. The relative visual assessment was carried out with the same criteria as described under item B2 described hereabove.

F3. Results Preparation of Security Features Made from the Inks E20-E25

TABLE 7B

Optical properties of the security features made from the inks E20-E25

| Sample No | Pigments | Ink vehicle | Visual assessment | | | Goniometer (Phyma) | |
|---|---|---|---|---|---|---|---|
| | | | Chroma | Color travel | Ink coverage | C* 22.5/22.5 | C° 45/45 |
| E20 | P1b (ChromaFlair ®) | V1 | Good | Excellent | Good | 73 | 59 |
| E21 | P1b (ChromaFlair ®) | V19 | Sufficient | Good | Sufficient | 70 | 56 |
| E22 | P1b (ChromaFlair ®) | V20 | Sufficient | Good | Sufficient | 72 | 58 |
| E23 | P1b (ChromaFlair ®) | V21 | Sufficient | Good | Sufficient | 73 | 59 |
| E24 | P1b (ChromaFlair ®) | V22 | Good | Excellent | Good | 72 | 57 |
| E25 | P1b (ChromaFlair ®) | V23 | Good | Excellent | Good | 68 | 52 |

As shown in Table 7B, the security features made of the UV-Vis curable screen printing security inks E20-E25 comprising an ink vehicle having a viscosity within the claimed range, comprising one or more oligomers within the claimed range and comprising one or more triacrylate monomers within the claimed range exhibited a good to an excellent visual appearance and high values of chroma as measured by the goniometer (visual assessment and goniometer assessment).

Inks (E26-29) Preparation and Printed Security Features Obtained Thereof—Influence of the Tetraacrylate Monomers G0. Preparation of UV-Vis Curable Ink Vehicle V1 and V24-V26 (Table 8A)

TABLE 8A

UV-Vis curable ink vehicle V1 and V24-V26

| Ingredient | Commercial name (supplier) | Chemical name (CAS number) | V1 | V24 | V25 | V26 |
|---|---|---|---|---|---|---|
| | | | Amount [wt-%] | | | |
| Oligomer | GENOMER* 4316 (RAHN) | Aliphatic polyester urethane acrylate (not available) | 35.1 | 35.1 | 35.1 | 35.1 |

TABLE 8A-continued

UV-Vis curable ink vehicle V1 and V24-V26

| Ingredient | Commercial name (supplier) | Chemical name (CAS number) | V1 | V24 | V25 | V26 |
|---|---|---|---|---|---|---|
| | | | Amount [wt-%] | | | |
| Triacrylate monomer | TMPTA (Allflex) | Trimethylolpropane triacrylate (15625-89-5) | 31.5 | | | |
| Tetraacrylate monomer | Miramer M410 (RAHN) | Ditrimethylolpropane tetraacrylate (94108-97-1) | | 31.5 | 31.5 | |
| Tetraacrylate monomer | Miramer M4004 (RAHN) | Ethoxylated (EO4) pentaerythritol tetraacrylate (51728-26-8) | | | | 31.5 |
| Photoinitiator | Speedcure TPO-L (LAMBSON) | Ethyl(2,4,6-trimethylbenzoyl)-phenyl phosphinate (84434-11-7) | | 3 | | |
| Photoinitiator | Omnirad 73 (IGM) | 2-Hydroxy-2-methyl-1-phenyl-propan-1-one (7473-98-5) | | 4 | | |
| Filler | Aerosil ® 200 (EVONIK) | Silicon dioxide (7631-86-9) | | 0.6 | | |
| Antifoaming agent | Tego ® Airex 900 (EVONIK) | Siloxanes and silicones, di-Me, reaction products with silica (67762-90-7) | | 1.2 | | |
| Diacrylate monomer | Miramer M216 (RAHN) | Propoxylated neopentyl glycol diacrylate (84170-74-1) | 24.6 | 24.6 | | |
| Diacrylate monomer | Sartomer 344 (Arkema) | Polyethylene glycol(400) diacrylate (26570-48-9) | | | 24.6 | 24.6 |
| | | Viscosity [mPas] | 750 | 1020 | 1360 | 920 |

Ingredients of the respective ink vehicles V1 and V24-V26 provided in Table 8A were mixed and dispersed at room temperature using a Dispermat (model CV-3) for 15 minutes at 1000-1500 rpm so as to yield 100 g of the respective ink vehicle.

Viscosity values provided in Table 8A were independently measured on about 15 g of the ink vehicle at 25° C. on a Brookfield viscometer (model "DV-I Prime", spindle S27 at 100 rpm).

G1. Preparation of UV-Vis Curable Screen Printing Security Inks (E26-E29)

The UV-Vis curable screen printing security inks (E26-E29) according to the invention were prepared with the respective ink vehicle V1 and V24-V26 described in Table 8A and flakes P1b. The security ink E26 was identical to the ink E1 of Table 2C and was prepared at the same time as the inks E27-E29.

17 wt-% of the flakes P1b were independently added to 83 wt-% of the respective ink vehicle V1 and V24-V26 and dispersed at room temperature using a Dispermat (model CV-3) for 5 minutes at 800-1000 rpm so as to independently obtain 20 g of the UV-Vis curable screen printing security inks (E26-E29) according to the invention described in Table 8B.

G2. Preparation and Optical Properties of Security Features Made from the Inks E26-E29 (Table 8B)

The UV-Vis curable screen printing security ink (E26-E29) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer described under A4-a and are provided in Table 8B. The relative visual assessment was carried out with the same criteria as described under item B2 described hereabove.

G3. Results Preparation of Security Features Made from the Inks E26-E29

TABLE 8B

Optical properties of the security features made from the inks E26-E29

| | | | Visual assessment | | | Goniometer (Phyma) | |
|---|---|---|---|---|---|---|---|
| Sample No | Pigments | Ink vehicle | Chroma | Color travel | Ink coverage | C* 22.5/22.5 | C° 45/45 |
| E26 | P1b (ChromaFlair ®) | V1 | Good | Excellent | Good | 72 | 57 |

TABLE 8B-continued

Optical properties of the security features made from the inks E26-E29

| Sample No | Pigments | Ink vehicle | Visual assessment | | | Goniometer (Phyma) | |
| | | | Chroma | Color travel | Ink coverage | C* 22.5/22.5 | C° 45/45 |
|---|---|---|---|---|---|---|---|
| E27 | P1b (ChromaFlair®) | V24 | Good | Good | Good | 71 | 56 |
| E28 | P1b (ChromaFlair®) | V25 | Good | Excellent | Good | 73 | 58 |
| E29 | P1b (ChromaFlair®) | V26 | Good | Good | Sufficient | 75 | 61 |

As shown in Table 8B, the security features made of the UV-Vis curable screen printing security inks E26-E29 comprising an ink vehicle having a viscosity within the claimed range, comprising one or more oligomers within the claimed range and comprising one or more triacrylate monomers within the claimed range exhibited (E26) or comprising one or more tetraaacrylate monomers within the claimed range exhibited (E27-E29) a good to an excellent visual appearance and high values of chroma as measured by the goniometer (visual assessment and goniometer assessment).

Inks (E30-34) Preparation and Printed Security Features Obtained Thereof—Influence of the Triacrylate/Tetraacrylate Monomers H0. Preparation of UV-Vis Curable Ink Vehicle V1 and V27-V30 (Table 9A)

TABLE 9A

UV-Vis curable ink vehicle V1 and V27-V30

| Ingredient | Commercial name (supplier) | Chemical name (CAS number) | V1 | V27 | V28 | V29 | V30 |
|---|---|---|---|---|---|---|---|
| | | | Amount [wt-%] | | | | |
| Oligomer | GENOMER* 4316 (RAHN) | Aliphatic polyester urethane acrylate (not available) | 35.1 | 35.1 | 35.1 | 35.1 | 35.1 |
| Triacrylate monomer | TMPTA (Allflex) | Trimethylolpropane triacrylate (15625-89-5) | 31.5 | 31.5 | | | |
| Triacrylate monomer | IMP(EO)₉ TA (Arkema) | Ethoxylated (EO9) trimethylolpropane acrylate (28961-43-5) | | | 31.5 | | |
| Triacrylate monomer | Ebecryl® 53 (Allflex) | Propoxylated glycerol triacrylates (52408-84-1) | | | | 31.5 | |
| Tetraacrylate monomer | Miramer M4004 (RAHN) | Ethoxylated (EO4) pentaerythritol tetraacrylate (51728-26-8) | | 24.6 | 24.6 | 24.6 | 24.6 |
| Tetraacrylate monomer | DiTMPTA (RAHN) | Ditrimethylolpropane tetraacrylate (94108-97-1) | | | | | 31.5 |
| Photoinitiator | Speedcure TPO-L (LAMBSON) | Ethyl(2,4,6-trimethylbenzoyl)-phenyl phosphinate (84434-11-7) | | | 3 | | |
| Photoinitiator | Omnirad 73 (IGM) | 2-Hydroxy-2-methyl-1-phenyl-propan-1-one (7473-98-5) | | | 4 | | |
| Inorganic extender | Aerosil® 200 (EVONIK) | Silicon dioxide (7631-86-9) | | | 0.6 | | |
| Diacrylate monomer | Miramer M216 (RAHN) | Propoxylated neopentyl glycol diacrylate (84170-74-1) | 24.6 | | | | |
| Anti-foaming agent | Tego® Airex 900 (EVONIK) | Siloxanes and silicones, di-Me, reaction products with silica (67762-90-7) | | | 1.2 | | |
| | | Viscosity [mPas] | 643 | 1400 | 1280 | 1300 | 1840 |

Ingredients of the respective ink vehicles V1 and V30-V34 provided in Table 9A were mixed and dispersed at room temperature using a Dispermat (model CV-3) for 15 minutes at 1000-1500 rpm so as to yield 100 g of the respective ink vehicle.

Viscosity values provided in Table 7A were independently measured on about 15 g of the ink vehicle at 25° C. on a Brookfield viscometer (model "DV-1 Prime", spindle S27 at 100 rpm).

H1. Preparation of UV-Vis Curable Screen Printing Security Inks (E30-E34)

The UV-Vis curable screen printing security inks (E30-E34) according to the invention were prepared with the respective ink vehicle V1 and V27-V30 described in Table 9A and flakes P1b. The security ink E30 was identical to the ink E1 of Table 2C and was prepared at the same time as the inks E31-E34.

17 wt-% of the flakes P1 b were independently added to 83 wt-% of the respective ink vehicle V1 and V27-V30 and dispersed at room temperature using a Dispermat (model CV-3) for 5 minutes at 800-1000 rpm so as to independently obtain 20 g of the UV-Vis curable screen printing security inks (E30-E34) according to the invention described in Table 9B.

H2. Preparation and Optical Properties of Security Features Made from the Inks E30-E34 (Table 9B)

The UV-Vis curable screen printing security ink (E30-E34) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer described under A4-a and are provided in Table 9B. The relative visual assessment was carried out with the same criteria as described under item B2 described hereabove.

H3. Results Preparation of Security Features Made from the Inks E30-E34

TABLE 9B

Optical properties of the security features made from the inks E30-E34

| Sample No | Pigments | Ink vehicle | Visual assessment | | | Goniometer (Phyma) | |
| --- | --- | --- | --- | --- | --- | --- | --- |
| | | | Chroma | Color travel | Ink coverage | C* 22.5/22.5 | C° 45/45 |
| E30 | P1b (ChromaFlair ®) | V1 | Good | Excellent | Good | 72 | 54 |
| E31 | P1b (ChromaFlair ®) | V27 | Good | Excellent | Good | 70 | 54 |
| E32 | P1b (ChromaFlair ®) | V28 | Good | Good | Sufficient | 75 | 58 |
| E33 | P1b (ChromaFlair ®) | V29 | Good | Good | Good | 71 | 57 |
| E34 | P1b (ChromaFlair ®) | V30 | Good | Excellent | Good | 68 | 54 |

As shown in Table 9B, the security features made of the UV-Vis curable screen printing security inks E30-E34 comprising an ink vehicle having a viscosity within the claimed range, comprising one or more oligomers within the claimed range and comprising a combination of one or more triacrylate monomers within the claimed range and one or more tetraaacrylate monomers within the claimed range exhibited a good to an excellent visual appearance and high values of chroma as measured by the goniometer (visual assessment and goniometer assessment).

The invention claimed is:

1. A UV-Vis radiation radically curable security ink comprising:
   i) from about 75 to about 99 wt-% of an ink vehicle having a viscosity between about 200 and about 2000 mPas at 25° C. and comprising
      a) from about 25 to about 55 wt-% of one or more radically curable oligomers having a molecular weight higher than 800 g/mol eq PS,
      b) from about 10 to about 50 wt-% of one or more radically curable monomers selected from the group consisting of
         i. triacrylates selected from the group consisting of trimethylolpropane triacrylates, trimethylolpropane trimethacrylates, alkoxylated trimethylolpropane triacrylates, alkoxylated trimethylolpropane trimethacrylates, alkoxylated glycerol triacrylates, pentaerythritol triacrylates, alkoxylated pentaerythritol triacrylates and mixtures thereof,
         ii. tetraacrylates selected from the group consisting of ditrimethylolpropane tetraacrylates, pentaerythritol tetraacrylates, alkoxylated pentaerythritol tetraacrylates and mixtures thereof,
         iii. and mixtures thereof,
      c) from about 0.1 to about 20 wt-% of one or more free radical photoinitiators,
      d) optionally up to about 50 wt-% of one or more reactive diluents being radically curable monomers selected from monoacrylates, diacrylates and mixtures thereof;
   the weight percent of a), b), c) and d) being based on the total weight of the ink vehicle; and
   ii) from about 1 to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal subox-ides, one or more metal fluorides, or mixtures of these materials and comprises an at least partial surface treatment layer facing the environment, being in direct contact with the top layer of the one or more at least partial coating layers and made of one or more surface modifiers selected from fluoro compounds, said fluoro compounds being functionalized with one or more phosphor (P) containing groups or one or more silicon (Si) containing groups, wherein said fluoro compounds are perfluoropolyethers functionalized with one or more phosphate containing groups, one or more silane containing groups or one or more siloxane containing groups, the weight percent of i) and ii) being based on the total weight of UV-Vis radiation radically curable security ink.

2. The UV-Vis radiation radically curable security ink according to claim 1, wherein the pigments comprise a flake-shaped metallic substrate consisting of a multilayer comprising one or more metallic layers, wherein said pigments comprise one or more at least partial coatings independently made of one or more metal oxides and/or one or more metal fluorides.

3. The UV-Vis radiation radically curable security ink according to claim 2, wherein the metallic substrate comprises one or more at least partial coatings independently made of one or more metal oxides.

4. The UV-Vis radiation radically curable security ink according to claim 1, wherein the pigments comprise a flake-shaped non-metallic substrate which is made of one or more materials selected from the group consisting of natural micas, synthetic micas and glasses.

5. The UV-Vis radiation radically curable security ink according to claim 4, wherein the non-metallic substrate comprises one or more at least partial coatings independently made of one or more metal oxides.

6. The UV-Vis radiation radically curable security ink according to claim 1, wherein the perfluoropolyethers are functionalized with one or more siloxane containing groups.

7. The UV-Vis radiation radically curable security ink according to claim 1, wherein the pigments have an average particle size (d50) between about 1 and about 100 μm.

8. The UV-Vis radiation radically curable security ink according to claim 1, further comprising one or more cationically curable compounds, and further comprising one or more cationic photoinitiators.

9. The UV-Vis radiation radically curable security ink according to claim 1, further comprising one or more dyes and/or one or more inorganic pigments, organic pigments or mixtures thereof.

10. A security feature obtained by
a) printing the UV-Vis radiation radically curable security ink recited in claim 1 onto a substrate, and
b) curing the UV-Vis radiation radically curable security ink in the presence of UV-Vis radiation so as to form the security feature.

11. An article comprising a substrate and a radiation cured coating obtained by UV-Vis radiation curing of the UV-Vis radiation radically curable security ink recited in claim 1.

12. The article according to claim 11, wherein the substrate is selected from the group consisting of papers or other fibrous materials, paper-containing materials, glasses, metals, ceramics, plastics and polymers, metallized plastics or polymers, composite materials and mixtures or combinations of two or more thereof.

13. A method for producing the article recited in claim 11, comprising the steps of
a. printing the UV-Vis radiation radically curable security ink on the substrate, and
b. curing the UV-Vis radiation radically curable security ink so as to form one or more security features.

14. The UV-Vis radiation radically curable security ink according to claim 1,
wherein the UV-Vis radiation radically curable security ink is a UV-Vis radiation radically curable screen printing security ink; and/or
wherein the triacrylates are selected from the group consisting of trimethylolpropane triacrylates, alkoxylated trimethylolpropane triacrylates, alkoxylated glycerol triacrylates, pentaerythritol triacrylates and mixtures thereof; and/or
wherein the tetraacrylates are selected from the group consisting of ditrimethylolpropane tetraacrylates, alkoxylated pentaerythritol tetraacrylates and mixtures thereof; and/or
wherein the one or more free radical photoinitiators are selected from the group consisting of aminoketones, hydroxyketones, alkoxyketones, acetophenones, benzophenones, ketosulfones, benzyl ketals; benzoin ethers, phosphine oxides, phenylglyoxylates, thioxanthones, and mixtures thereof.

15. The UV-Vis radiation radically curable security ink according to claim 2, wherein the one or more metallic layers are thin film interference multilayers having a Fabry-Perot absorber/dielectric/reflector/dielectric/absorber structure.

16. The UV-Vis radiation radically curable security ink according to claim 8, wherein the one or more cationically curable compounds are present in an amount from about 5 to about 15 wt-%, the weight percent being based on the total weight of the UV-Vis radiation radically curable security ink; wherein the one or more cationic photoinitiators are selected from the group consisting of onium salts, oxonium salts, sulphonium salts and mixtures thereof; and wherein the one or more cationic photoinitiators are present in an amount from about 0.1 to about 20 wt-%, the weight percent being based on the total weight of the UV-Vis radiation radically curable security ink.

17. The security feature according to claim 10, wherein the printing process is selected from the group consisting of rotogravure processes, flexography processes and screen printing processes.

18. The article according to claim 11, wherein the UV-Vis radiation radically curable security ink is a UV-Vis radiation radically curable screen printing security ink.

19. The method according to claim 13,
wherein the UV-Vis radiation radically curable security ink is a UV radiation radically curable screen printing security ink.

* * * * *